(12) United States Patent
Monson et al.

(10) Patent No.: US 11,216,079 B2
(45) Date of Patent: *Jan. 4, 2022

(54) HAND GESTURES RECOGNITION OVER A SWITCH BASED KEYBOARD

(71) Applicant: Cirque Corporation, Sandy, UT (US)

(72) Inventors: Brian Monson, Farmington, UT (US); Jared Bytheway, Sandy, UT (US); Jon Bertrand, Taylorsville, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,052

(22) Filed: Apr. 12, 2021

(65) Prior Publication Data
US 2021/0232233 A1 Jul. 29, 2021

Related U.S. Application Data

(63) Continuation of application No. 16/549,790, filed on Aug. 23, 2019, now Pat. No. 11,003,254.

(51) Int. Cl.
G06F 3/02 (2006.01)
G06F 3/01 (2006.01)
G06F 3/044 (2006.01)
G06F 3/023 (2006.01)
G06F 3/0484 (2013.01)
G06F 3/16 (2006.01)

(52) U.S. Cl.
CPC ............ G06F 3/0202 (2013.01); G06F 3/017 (2013.01); G06F 3/023 (2013.01); G06F 3/0233 (2013.01); G06F 3/044 (2013.01); G06F 3/04847 (2013.01); G06F 3/165 (2013.01); G06F 3/04842 (2013.01); G06F 2203/04108 (2013.01)

(58) Field of Classification Search
None
See application file for complete search history.

(56) References Cited

U.S. PATENT DOCUMENTS

| | | |
|---|---|---|
| 5,327,161 A | 7/1994 | Logan |
| 5,463,388 A | 10/1995 | Boie |
| 5,675,361 A | 10/1997 | Santilli |
| 6,204,839 B1 | 3/2001 | Mato |
| 6,681,268 B1 | 1/2004 | Kikuchi |
| 6,983,336 B2 | 1/2006 | Kikuchi |
| 6,986,614 B2 | 1/2006 | McLoone |
| 7,189,017 B2 | 3/2007 | McLoone |
| 2005/0057489 A1 | 3/2005 | Kung |
| 2005/0259086 A1 | 11/2005 | Chiu |
| 2007/0279385 A1 | 12/2007 | Woolley |

(Continued)

Primary Examiner — Christopher J Kohlman

(57) ABSTRACT

A computing device may include a keyboard, a switch in mechanical communication with an underside of a key arranged in the keyboard, a processor, a transmit line electrically connected to the processor, a sense line electrically connected to the processor, and the transmit line and the sense line are selectively connectable through the switch when the key is depressed, memory in communication with the processor, and programmed instructions stored in the memory that, when executed, cause the processor to identify changes in capacitance from the sense line when the key is not depressed, identify a hand gesture performed proximate the keyboard based on the changes in capacitance, and execute an action based on at least one the identification of the hand gesture.

20 Claims, 22 Drawing Sheets

(56) References Cited

U.S. PATENT DOCUMENTS

| | | | | |
|---|---|---|---|---|
| 2010/0123676 A1* | 5/2010 | Kirkup | .................... | G06F 1/169 |
| | | | | 345/174 |
| 2014/0267043 A1* | 9/2014 | Kaiser | ................. | G06F 3/04883 |
| | | | | 345/168 |
| 2014/0320408 A1* | 10/2014 | Zagorsek | ................ | G06F 3/017 |
| | | | | 345/158 |

* cited by examiner

HAND GESTURES RECOGNITION OVER A SWITCH BASED KEYBOARD

RELATED APPLICATIONS

The present application is a continuation of U.S. patent Ser. No. 16/549,790 by Brian Monson et al., filed on Aug. 23, 2019 and titled "Hand Gesture Recognition over a Switch Based Keyboard." U.S. patent Ser. No. 16/549,790 claims priority to U.S. Provisional Patent Application No. 62/879,851 by Brian Monson et al., entitled "Hybrid Circuit or a Touch Pad and Keyboard," filed on Jul. 29, 2019, assigned to the assignee hereof. Each of these documents are expressly incorporated by reference herein.

BACKGROUND

The present invention relates to computing devices in general and, in particular, to computing devices with a keyboard. The keyboard generally includes an arrangement of keys where each key is connected to an electrical switch located under the key. Multiple transmit lines provide a voltage to one side of the switches associated with different keys. The other side of the switches are connected to different sense lines. When the switches close in response to a user depressing the keys, the respective transmit lines and sense lines are temporarily brought into contact. This temporary contact can be detected by measuring the voltage on the sense lines.

An example of a circuit that operates both a touchpad and a keyboard is disclosed in U.S. Patent Publication No. 20070279385 issued to Richard D. Woolley, et al. (hereinafter, the '385 Publication). This reference expressly teaches that touchpad sensor control circuitry can control the operation of a touch or proximity sensitive touchpad in a first mode, and in a second mode functions as a keyboard controller. The touchpad sensor control circuitry also determines which keys on a keyboard have been actuated by manipulation of keys, wherein pressing a key is detected by the touchpad sensor control circuitry.

In another embodiment described in the '385 Publication, a touchpad and a keyboard are both active at the same time. This mode of simultaneous operation is possible because the touchpad sensor control circuitry is operating in a typical capacitive mode. But it should also be realized that because the keyboard and the touchpad are both active, this embodiment draws more power than in embodiments where the circuitry switches modes to operate the touchpad or the keyboard independently. In the embodiment where the circuit simultaneously controls the keyboard and the touchpad, the '385 Publication describes that the touchpad sensor control circuitry is coupled to the touchpad via a grid of electrodes where a first set of electrodes are configured as X electrodes, and a second set of electrodes are configured as Y electrodes. All measurements of touchpad parameters are taken from a single sense electrode, and not from the sets of X or Y electrodes. The '385 Publication further explains that the sense electrode is not disposed in the same layers as the X and Y electrodes. Instead, the sense electrode is electrically isolated from the X and Y electrodes.

The '385 Publication describes that the keyboard is redesigned to have a plurality of keys arranged to be disposed above the grid. The grid of X and Y electrodes intersect underneath the keys of the keyboard. When any key of the keyboard is pressed, the mutual capacitance between the X and Y electrodes and the sense electrode beneath that key will be changed, and that change in capacitance is detected by the touchpad sensor control circuitry.

A second prior art reference, U.S. Pat. No. 6,204,839 issued to Stephan A. Mato, describes a combination keyboard and pointing device is incorporated in a portable computer and includes a dielectric base member on a top side of which a spaced series of electrically conductive pad member portions of a capacitance-based proximity sensing system are formed. Manually depressible key members are positioned above the pads. With the sensing system switched to a typing mode, the pads capacitively sense the proximity, velocity and acceleration of a user's fingers depressing their associated keys and output signals useable by the computer to display the character associated with the depressed key. A sensed increased stroke velocity of each manually depressed key may be used to alter the key character image displayed on the screen, for example capitalizing, bolding or underlining the character. The sensing system may be manually or automatically switched from its typing mode to a pointing mode in which it capacitively senses various hand and finger motions and orientations to carry out various pointing functions, such as cursor movements, pick functions, and scrolling functions, in response to the sensed hand and finger motions and orientations. Both of these references are herein incorporated by reference for all that they disclose.

SUMMARY

In one embodiment of the present disclosure, an input device may include a keyboard system where the keyboard system includes a keyboard transmit line electrically connected to an integrated circuit, a keyboard sense line electrically connected to the integrated circuit, and the keyboard transmit line and the keyboard sense line are selectively connectable through a switch incorporated into the keyboard system. The input device may also include a capacitive touch system where the capacitive touch system includes a touch transmit line electrically connected to the integrated circuit, and a touch sense line electrically connected to the integrated circuit. The keyboard system and the capacitive touch system may use at least one common component of the integrated circuit during operation, and the keyboard system and the capacitive touch system are executable simultaneously.

The input device may include a first input/output connecting the keyboard sense line to the integrated circuit and a second input/output connecting the touch sense line to the integrated circuit.

The input device may include a third input/output connecting the keyboard transmit line to the integrated circuit and a fourth input/output connecting the touch transmit line to the integrated circuit.

The input device may include a third input/output connecting both the keyboard transmit line and the touch transmit line to the integrated circuit.

The input device may include a keyboard transmit line and the touch transmit line that are combined and executable simultaneously.

The at least one common component of the integrated circuit may include at least one of the group consisting of: transmit pin, receive pin, memory, processing resources, a communication pin, a regulator, and combinations thereof.

The switch may be selected from the group consisting of: a dome switch, a membrane switch, a mechanical switch, a galvanic switch, and combinations thereof.

The input device may include a first set of logic dedicated to processing signals generated from closure of the switch in the keyboard system and a second set of logic dedicated to processing capacitive signals generated in the capacitive touch system and in the keyboard system.

The integrated circuit may include memory and programmed instructions to identify placement of a user's finger in relation to the keyboard system with the second set of logic independent of whether the user's finger depresses a key of the keyboard system while simultaneously identifying keys of the keyboard system that are depressed by the user's finger.

The integrated circuit may include memory and programmed instructions to identify an approach of a user's finger with the second set of logic and activate a backlight integrated into the keyboard system based at least one the identification of the approach.

The integrated circuit may include memory and programmed instructions to identify a hand gesture performed by a user proximate the keyboard system with the second set of logic and execute an action based on at least one the identification of the hand gesture.

The integrated circuit may include memory and programmed instructions to identify a proximity of a user's finger over a key of the keyboard system with the second set of logic, measure a capacitance value proximate the key indicative that the key is depressed with the second set of logic, identify that the first set of logic failed to identify the key is depressed, and execute a command to indicate that the key is depressed.

The integrated circuit may include memory and programmed instructions to identify a depression of a key of the keyboard system with the first set of logic and classify a measurement being processed with the second set of logic as a false positive based at least in part on the identification of the depression of the key.

The measurement may be based, at least in part, on a palm of a user proximate a touch pad of the capacitive touch system.

In one embodiment of the present disclosure, a computing device may include a keyboard system. The keyboard system may include a plurality of keyboard transmit lines electrically connected to an integrated circuit, a plurality of keyboard sense lines electrically connected to the integrated circuit, the plurality of keyboard sense lines and the plurality of keyboard transmit lines oriented in a grid pattern, a plurality of switches located the intersections of the keyboard transmit lines and keyboard sense lines of the gird pattern where wherein the plurality of keyboard transmit lines and the plurality of keyboard sense lines are selectively connectable through a switch incorporated into the keyboard system. The computing device may include a capacitive touch system. The capacitive touch system may include a plurality of touch transmit lines electrically connected to the integrated circuit and a plurality of touch sense lines electrically connected to the integrated circuit. The keyboard system and the capacitive touch system may use at least one common component of the integrated circuit during operation, and the keyboard system and the capacitive touch system are executable simultaneously.

The computing device may include a first set of input/outputs connecting the keyboard sense lines to the integrated circuit and a second of set input/outputs connecting the touch sense lines to the integrated circuit.

The computing device may include a third set of input/outputs connecting the keyboard transmit lines to the integrated circuit and a fourth of set input/outputs connecting the touch transmit lines to the integrated circuit.

The computing device may include a third set of input/outputs connecting both the keyboard transmit lines and the touch transmit lines to the integrated circuit.

Pairs of the keyboard transmit lines and the touch transmit lines may be sequenced together.

At least some of the touch transmit lines and the keyboard transmit lines are combined and are energized simultaneously.

In one embodiment of the present disclosure, a computing device may include a keyboard, a switch in mechanical communication with an underside of a key arranged in the keyboard, a processor, a transmit line electrically connected to the processor, a sense line electrically connected to the processor, and the transmit line and the sense line are selectively connectable through the switch when the key is depressed, memory in communication with the processor, and programmed instructions stored in the memory that, when executed, cause the processor to measure at least one change in capacitance from the sense line, identify the at least one change as a capacitive characteristic indicative that the key is depressed, identify that logic configured to indicate that the key is depressed from measurements associated with a temporary connection made between the transmit line and the sense line failed to identify the key is depressed, and execute a command to indicate that the key is depressed.

Identifying the at least one change includes consulting a data structure of at least one stored capacitive characteristics indicative the key being depressed.

The programmed instructions, when executed, may cause the processor to execute a machine learning module to determine the at least one stored capacitive characteristic indicating that the key is depressed.

Executing a command to indicate that the key is depressed may include consulting a program operating on the computing device based on input from the keyboard, analyzing a sequence of instructions based on the input from the instructions from the keyboard, generating a likelihood value that the instructions were intended to receive input from the keyboard compatible with the key being depressed based at least in part on the analyzing, and indicating the key is depressed based on the likelihood value.

The program may be a word processing program.

The sequence of instructions may include a misspelled word.

The at least one capacitive characteristic may include exceeding a capacitive value threshold.

The at least one capacitive characteristic may include an overall change in a capacitive value.

The at least one capacitive characteristic may include a rate of change in a capacitive value.

In one embodiment of the present disclosure, a method of controlling a computing device may include measuring at least one change in capacitance on a sense line of a keyboard, wherein the keyboard includes a transmit line are selectively connectable to the sense line through a switch when the key is depressed; identifying the change as a capacitive characteristic indicative that the key is depressed; identifying that logic configured to indicate that the key is depressed from measurements associated with a temporary connection made between the transmit line and the sense line failed to identify the key is depressed; and executing a command to indicate that the key is depressed.

Identifying the at least one change may include consulting a data structure of at least one stored capacitive characteristic indicative that the key being depressed.

The method may include executing a machine learning model to determine the at least one stored capacitive characteristics indicating that the key is depressed.

Executing a command to indicate that the key is depressed may include consulting a program operating on the computing device based on input from the keyboard, analyzing a sequence of instructions based on the input from the instructions from the keyboard, generating a likelihood value that the instructions were intended to receive input from the keyboard compatible with the key being depressed based at least in part on the analyzing, and indicating the key is depressed based on the likelihood value.

The program may be a word processing program.

The sequence of instructions may include a misspelled word.

The at least one capacitive characteristic may include exceeding a capacitive value threshold.

The at least one capacitive characteristic may include an overall change in a capacitive value.

In one embodiment of the present disclosure, a computer-program product for controlling a computing device may include a non-transitory computer-readable medium storing instructions executable by a processor to measure at least one change in capacitance on a sense line of a keyboard, wherein the keyboard may include a transmit line are selectively connectable to the sense line through a switch when the key is depressed; identify the at least one change as a capacitive characteristic indicative that the key is depressed; identifying that logic configured to indicate that the key is depressed from measurements associated with a temporary connection made between the transmit line and the sense line failed to identify the key is depressed; and executing a command to indicate that the key is depressed.

Identifying the at least one change may include consulting a data structure of at least one stored capacitive characteristic indicative the key being depressed.

The instructions may be executable by a processor to execute a machine learning model to determine the at least one stored capacitive characteristic indicating that the key is depressed.

In one embodiment of the present disclosure, a computing device may include a keyboard, a switch in mechanical communication with an underside of a key arranged in the keyboard, a processor, a transmit line electrically connected to the processor, a sense line electrically connected to the processor, and the transmit line and the sense line are selectively connectable through the switch when the key is depressed, memory in communication with the processor, and programmed instructions stored in the memory that, when executed, cause the processor to identify changes in capacitance from the sense line when the key is not depressed, identify a hand gesture performed proximate the keyboard based on the changes in capacitance, and execute an action based on at least one the identification of the hand gesture.

The action may include changing a power mode of the computing device.

The action may include executing a command for a program operating on the computing device.

The action may include changing a display setting on the computing device.

The action may include changing an audio setting incorporated into the computing device.

The action may include activating a backlight incorporated into the computing device.

The action may include moving a cursor presented in a display of the computing device.

The action may include selecting an object presented in a display of the computing device.

The hand gesture may be selected from the group consisting of moving a hand along at least a portion of the length of the keyboard, moving the hand along at least a portion of the width of the keyboard, moving the hand vertical over the keyboard, moving the hand diagonally over the keyboard, moving the hand in a U-shaped movement over the keyboard, moving the hand in a circular movement over the keyboard, and combinations thereof.

The hand gesture may be executed with a single hand.

The hand gesture may be executed with multiple hands.

The computing device may include a display and the programmed instructions, when executed, cause the processor to present a controlled parameter in the display and change the controlled parameter based on a characteristic of the hand gesture.

Executing an action may be based, at least in part, on a two-dimensional location of the hand gesture with respect to the keyboard.

Executing an action may be based, at least in part, on a three-dimensional location of the hand gesture with respect to the keyboard.

In one embodiment of the present disclosure, a method of controlling a computing device may include identifying changes in capacitance on a sense line of a keyboard even when a key of the keyboard is not depressed where the keyboard includes a transmit line are selectively connectable to the sense line through a switch when the key is depressed, identifying a hand gesture performed proximate the keyboard based on the changes in capacitance, and executing an action based on at least one the identification of the hand gesture.

The method may include presenting a controlled parameter in the display and changing the controlled parameter based on a characteristic of the hand gesture.

Executing an action may be based, at least in part, on a two-dimensional location of the hand gesture with respect to the keyboard.

Executing an action may be based, at least in part, on a three-dimensional location of the hand gesture with respect to the keyboard.

In one embodiment of the present disclosure, a computer-program product for controlling a computing device may include a non-transitory computer-readable medium storing instructions executable by a processor to identify changes in capacitance on a sense line of a keyboard even when a key of the keyboard is not depressed, wherein the keyboard includes a transmit line are selectively connectable to the sense line through a switch when the key is depressed; identify a hand gesture performed proximate the keyboard based on the changes in capacitance; and execute an action based on at least one the identification of the hand gesture.

The instructions may be executable by a processor to present a controlled parameter in the display and change the controlled parameter based on a characteristic of the hand gesture.

In one embodiment of the present disclosure, a method of operating an input device may include measuring a first change in electrical properties of a sense line when a switch at an intersection of the sense line and a transmit line closes, interpreting the first change as a key depression, measuring a second change in electrical properties of the sense line when the switch at an intersection of the sense line and the transmit line is open, and interpreting the second change as a proximity signal.

The first change may be a voltage change.

The second change may be a current change.

The second change may be a result of a hand proximate the key.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" generally refers to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, and the term "Rx" generally refers to a sense line.

Figure 1:
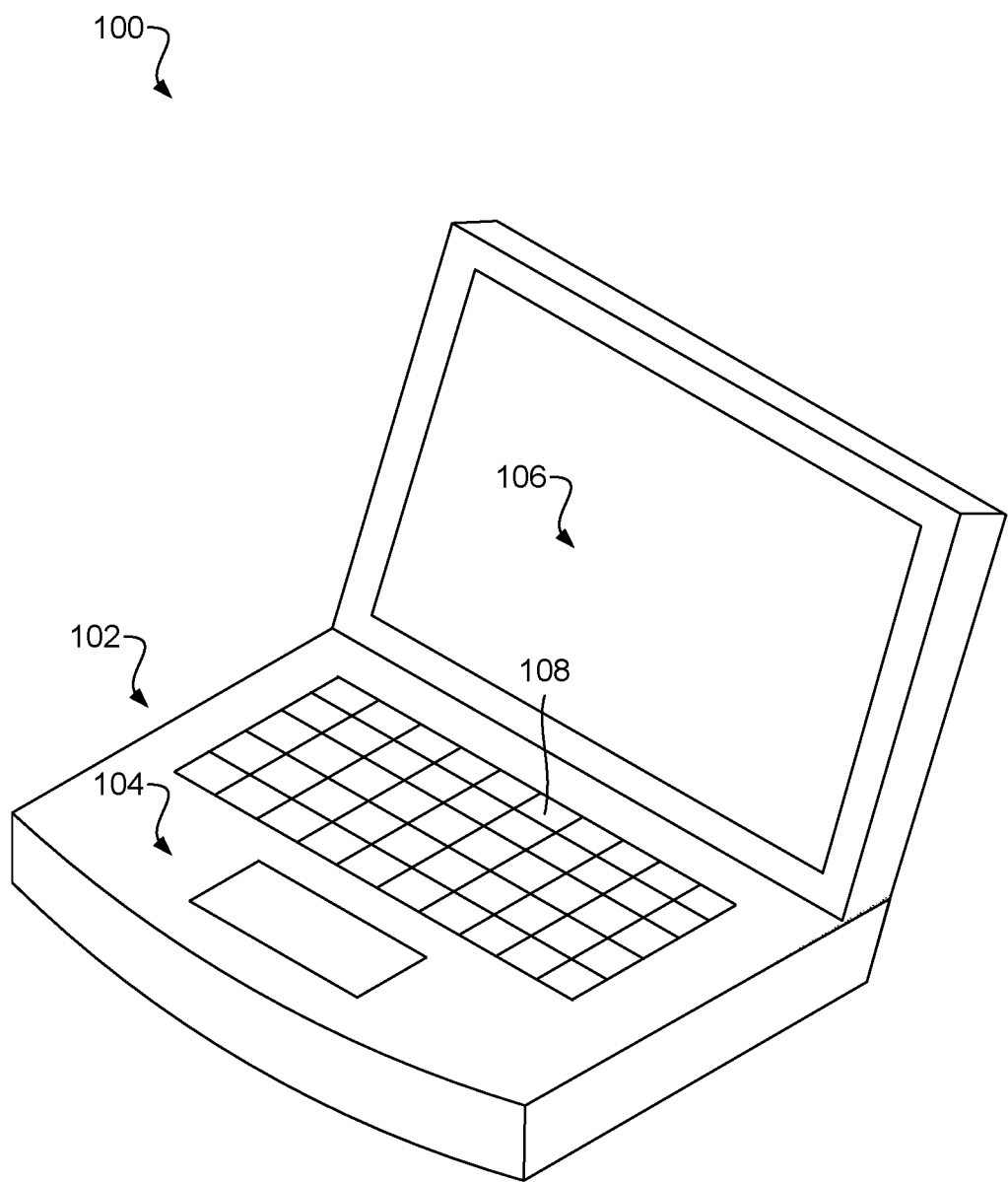
FIG. 1 depicts an example of a computing device according to the present disclosure.

FIG. 1 depicts an example of a computing device 100. In this example, the computing device is a laptop. In the illustrated example, the computing device 100 includes an input device, such as a keyboard 102 and a touch pad 104. The computing device 100 also includes a display 106. A program operated by the computing device 100 may be depicted in the display 106 and controlled by a sequence of instructions that are provided by the user through the keyboard 102 and/or through the touch pad 104.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to add different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

Figure 2:
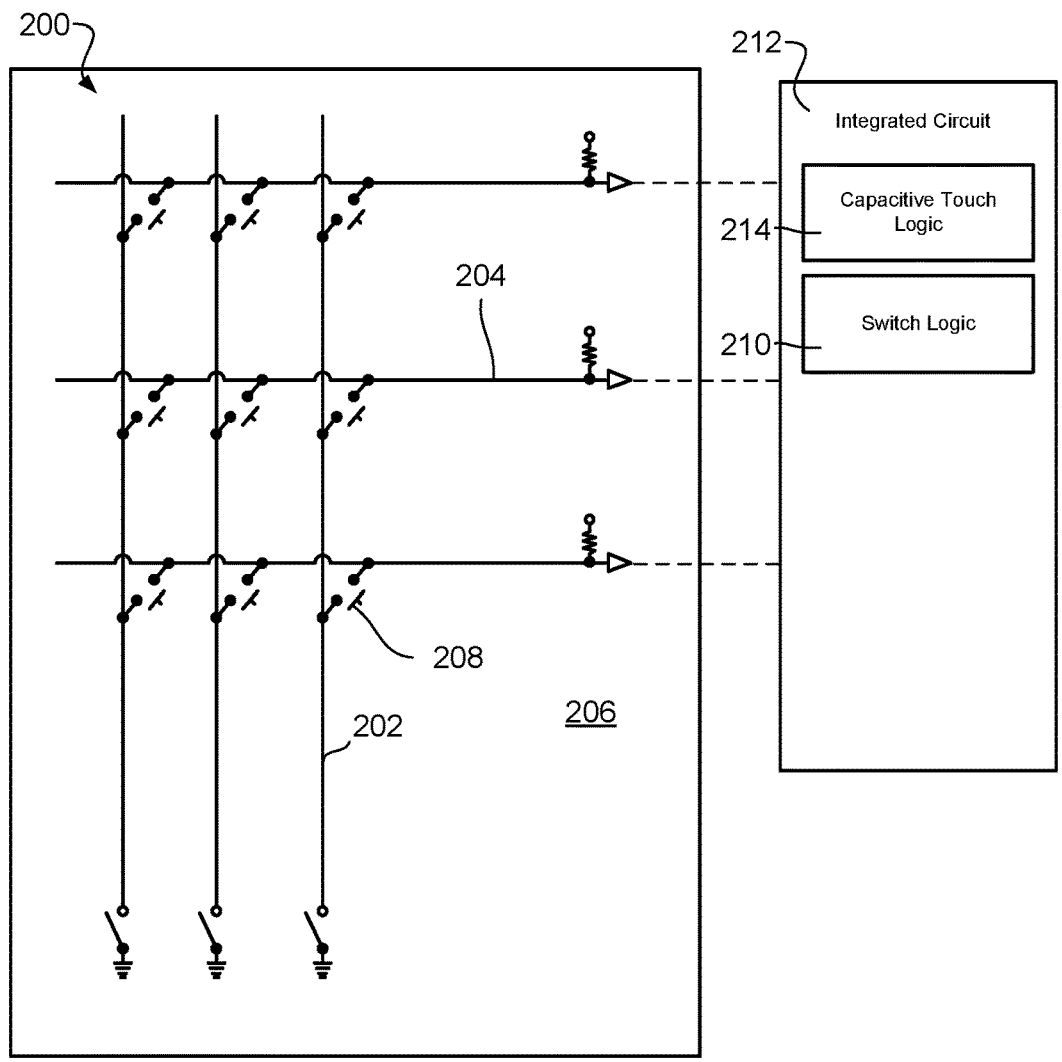
FIG. 2 depicts an example of a grid of keyboard transmit lines and keyboard sense lines according to the present disclosure.

FIG. 2 depicts an example of circuitry for the keyboard 100 depicted in FIG. 1. In this example, a grid 200 of keyboard transmit lines 202 and keyboard sense lines 204 are arranged on a printed circuit board 206 underneath the arrangement of keys 108. In the illustrated example, just a representative number of the keyboard transmit lines 202 and the keyboard sense lines 204 are depicted for simplicity. In this example, each of the keyboard transmit lines 202 are connected to keyboard sense lines 204 through switches 208. The switches 208 may be associated with keys of the keyboard 102. The portions of the keyboard transmit line 202 and the portions of the keyboard sense line 204 in the grid 200 are considered for purposes of this disclosure to be the electrode portion of the keyboard transmit lines 202 and the keyboard sense lines 204. The portions of the keyboard transmit lines 202 and the keyboard sense lines 204 that are outside of the grid 200 that send information to the integrated circuit are considered for purposes of this disclosure to be trace or route portions of the keyboard transmit lines 202 and the keyboard sense lines 204.

Any appropriate type of switch may be used in accordance with the principles described in the present disclosure. A non-exhaustive list of switches that may be used in accordance with the present disclosure include, but are not limited to, dome switches, membrane switches, mechanical switches, galvanic switches, other types of switches, or combinations thereof.

A voltage may be applied to each of the keyboard transmit lines 202 individually based on a predetermined sequence. In some cases, the sequence may cycle through each of the keyboard transmit lines 202 in a specific order and allow each of the transmit lines to be energized individually at different times. In other examples, each of the keyboard transmit lines 202 may have a voltage continuously applied.

When a key is depressed, the physical movement of the key causes the portions of the respective keyboard transmit line 202 and the keyboard sense line 204 to temporarily make physical contact. This temporary physical contact results in an electrical connection between the keyboard transmit line 202 and the keyboard sense line 204, and causes the voltage of the keyboard transmit line 202 to change. The change in voltage on the keyboard sense line 204 is measured. The location of the depressed key is determined based on the intersection of the energized keyboard transmit line and the keyboard sense line 204 with the change in voltage.

Switch logic 210 of an integrated circuit 212 in communication with the traces of the keyboard transmit lines 202 and the keyboard sense lines 204 may interpret the voltage changes to determine which keys are depressed. This information may be sent to an operating system that is running a program on the computing device.

Capacitive touch logic 214 of the same integrated circuit 212 may receive inputs from the touch pad 104. The information from the touch pad 104 may be used to determine information about the location of the cursor, selection of objects in the computing device's display, or other types of information. This information may also be sent from the integrated circuit 212 to the operating system to provide additional instructions to the program being operating by the computing device.

The integrated circuit 212 may process the voltage inputs from the keyboard 102 and the capacitance measurements from the touch pad 104 simultaneously. Processed information from the integrated circuit 212 relating to the keyboard 102 and the touch pad 104 may be sent simultaneously to the operating system. In some cases, the information received from either the keyboard 102 or the touch pad 104 is processed and sent in real time without interference from each other.

One advantage to processing the touch pad and keyboard inputs on the same integrated circuit is that inconsistencies between the keyboard inputs and the touch pad inputs can be addressed at the integrated circuit level rather than sending the inconsistent signals to the operating system before the inconsistencies are addressed. For example, in certain instances where the palm of the user's hand is resting on the touch pad while the user is typing may result in inputs from the touch pad and the keyboard at the same time which may appear inconsistent. In some cases, the integrated circuit 212 may run a process that results in rejecting the inputs from the touch pad and sends only the inputs from the keyboard to the operating system. This saves incorrect information from being sent through multiple processing levels. Thus, bandwidth and processing resources are used more efficiently.

In some cases, the capacitive touch logic 214 may be used to interpret signals from the keyboard's gird 200. The keyboard transmit lines 202 and keyboard sense lines 204 may store capacitive energy between each other at the intersection when the switches 208 are open and the keyboard transmit line 202 is energized. However, the value of this capacitance may change when another electrical conductor, such as a user's hand or finger, is proximate the key associated with the open switch. When the capacitance changes due to the proximity of the finger, hand, or other electrical conductor, the electrical current along the length of the keyboard sense line 204 may move causing a measurable change in the current at locations along the keyboard sense line 204. In some cases, the change in the current may be detectable through a change in the voltage on the sense line.

The changes in electrical properties on the keyboard sense line 204 due to the closure of a switch may be distinguishable from the changes in the electrical properties on the keyboard sense line 204 when a finger, hand, or another electrical conductor is proximate the key. Since these changes in electrical characteristics are disguisable, the capacitive touch logic 214 in the integrated circuit 212 can distinguish between these inputs through the keyboard. In some cases, these different types of signals from the keyboard may be processed simultaneously by the same integrated circuit.

In some examples, the integrated circuit 212 is in communication with both a keyboard and a touch pad. In this example, the switch logic 210 may be used to process inputs from the keyboard, and the capacitive touch logic 214 may be used to process inputs both the keyboard 102 and the touch pad 104.

In other examples, the integrated circuit 212 is not attached to a touch pad. In such an example, the switch logic 210 and the capacitive touch logic 214 can both be used to process inputs from the keyboard 102.

Figure 3:
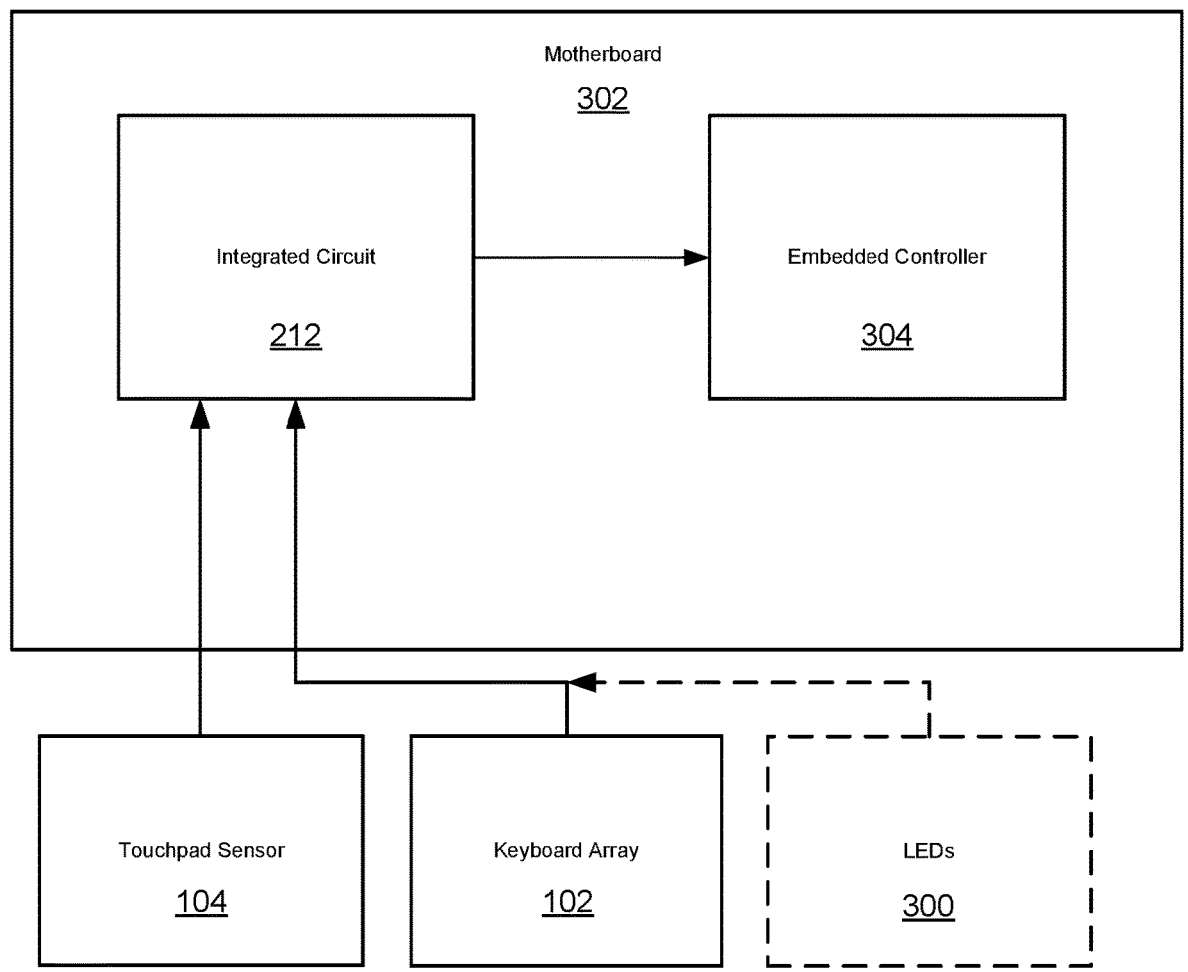
FIG. 3 depicts an example of components of a computing device according to the present disclosure.

FIG. 3 depicts an example of components of a computing device 100. In this example, a keyboard 102 and a touch pad 104 are in communication with an integrated circuit 212. In some cases, a backlight system, such as a light emitting diode (LED) system 300, may be connected to the integrated circuit directly or indirectly through the keyboard's circuitry.

The integrated circuit 212 may be located on a motherboard 302 of the computing system 100.

The motherboard 302 may provide additional layers of processing for the components of the computing system. The motherboard may include a printed circuit board (PCB) and multiple control circuits, memory, and processing units on the PCB. The motherboard may provide a processing layer where the control circuits interact with each other. Additionally, the PCB of the motherboard 302 may include connectors where peripheral devices can be plugged in. The motherboard 302 may include traces that connect different control circuits together. In some computing systems 100, the motherboard 302 may include an embedded controller 304 that may provide at least some processing resources to specific controller circuits. In this example, the integrated circuit provides information to the embedded controller 304. Another advantage to the principles described in the present disclosure is that real estate on the motherboard is minimized by having a single integrated circuit 212 on the motherboard 302 that handles the processing of the touch pad and the keyboard rather than having a separate integrated circuit for each of the keyboard and the touch pad.

The logic that processes the capacitive touch inputs and the logic that processes the switch inputs can share common components by being part of the same circuit, thereby simplifying the circuitry of the computing device and reducing parts. At least one of the common components that these sets of logic may share include transmit pins, receive pins, memory, processing resources, communication pins, regulators, other components, or combinations thereof.

Figure 4:
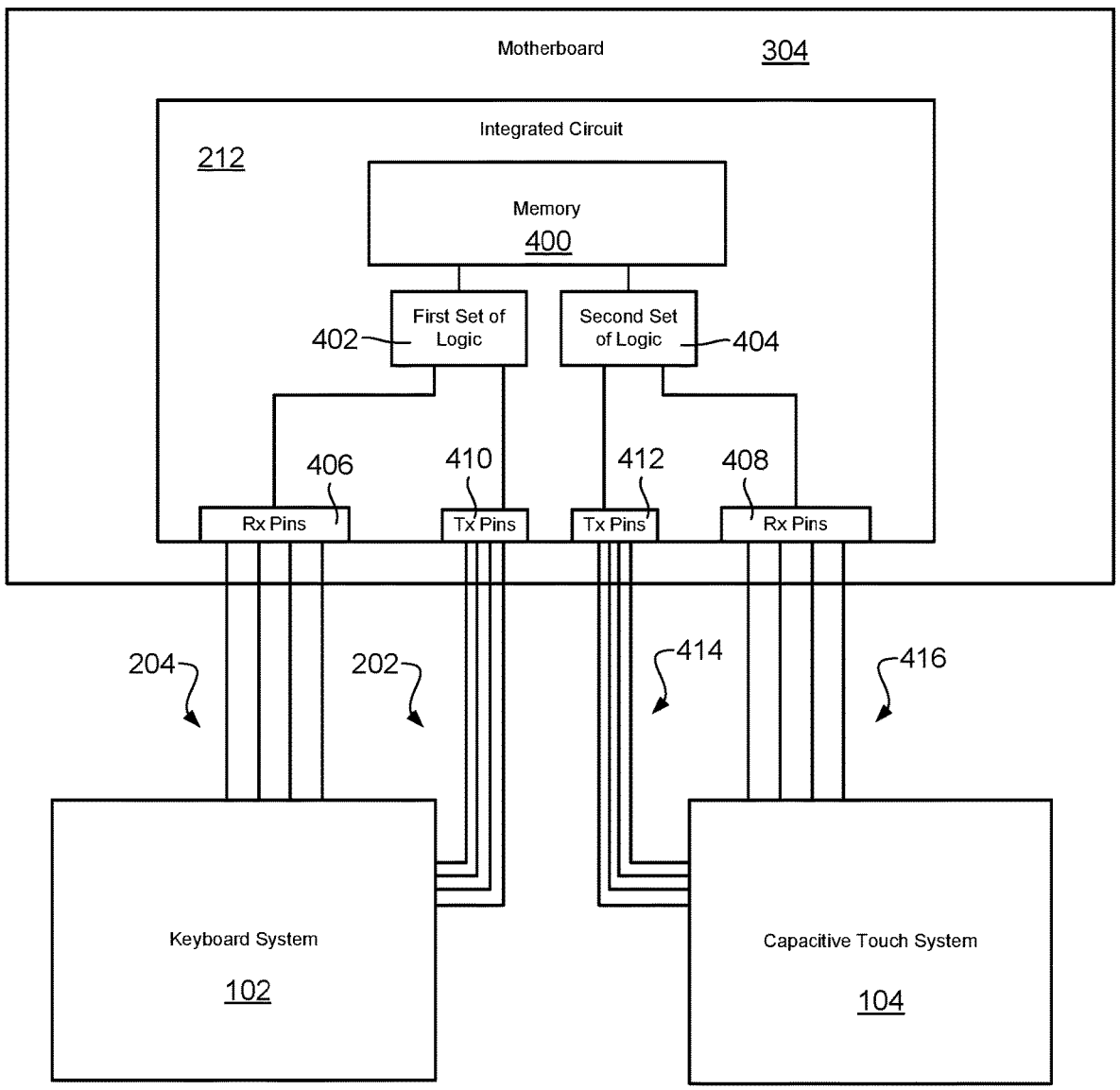
FIG. 4 depicts an example of a keyboard and a touchpad in communication with an integrated circuit according to the present disclosure.

FIG. 4 depicts an example of an integrated circuit 212 located on the motherboard 304. The integrated circuit 212 includes memory 400, a first set 402 of logic for processing switch inputs, and a second set 404 of logic for processing capacitive touch/proximity sensing. The first set 402 of logic is connected to a first set 406 of input/outputs (Rx Pins), and the second set 404 of logic is connected to a second set 408 of input/outputs (Rx Pins). Additionally, the first set 402 of logic is connected to a third set 410 of input/outputs (Tx Pins), and the second set 404 of logic is connected to a fourth set 412 of input/outputs (Tx Pins).

In this example, the first set 402 of logic may control the keyboard transmit lines 202 through the third set of Tx pins 410, and the second set 404 of logic may control the touch transmit lines 414 through the fourth set of Tx pins 412. The keyboard sense lines 204 are connected to the first set 406 of input/outputs (Rx Pins), and the touch sense lines 416 are connected to the second set 408 of input/out puts (Rx Pins). In this example, each of the transmit lines of the keyboard and the touch pad may be sequenced independently of each other. In some cases, the transmit lines are sequenced to be synchronized with each other. In yet another example, at least one of the keyboard transmit lines 202 and the touch transmit lines 414 are continuously energized.

Figure 5:
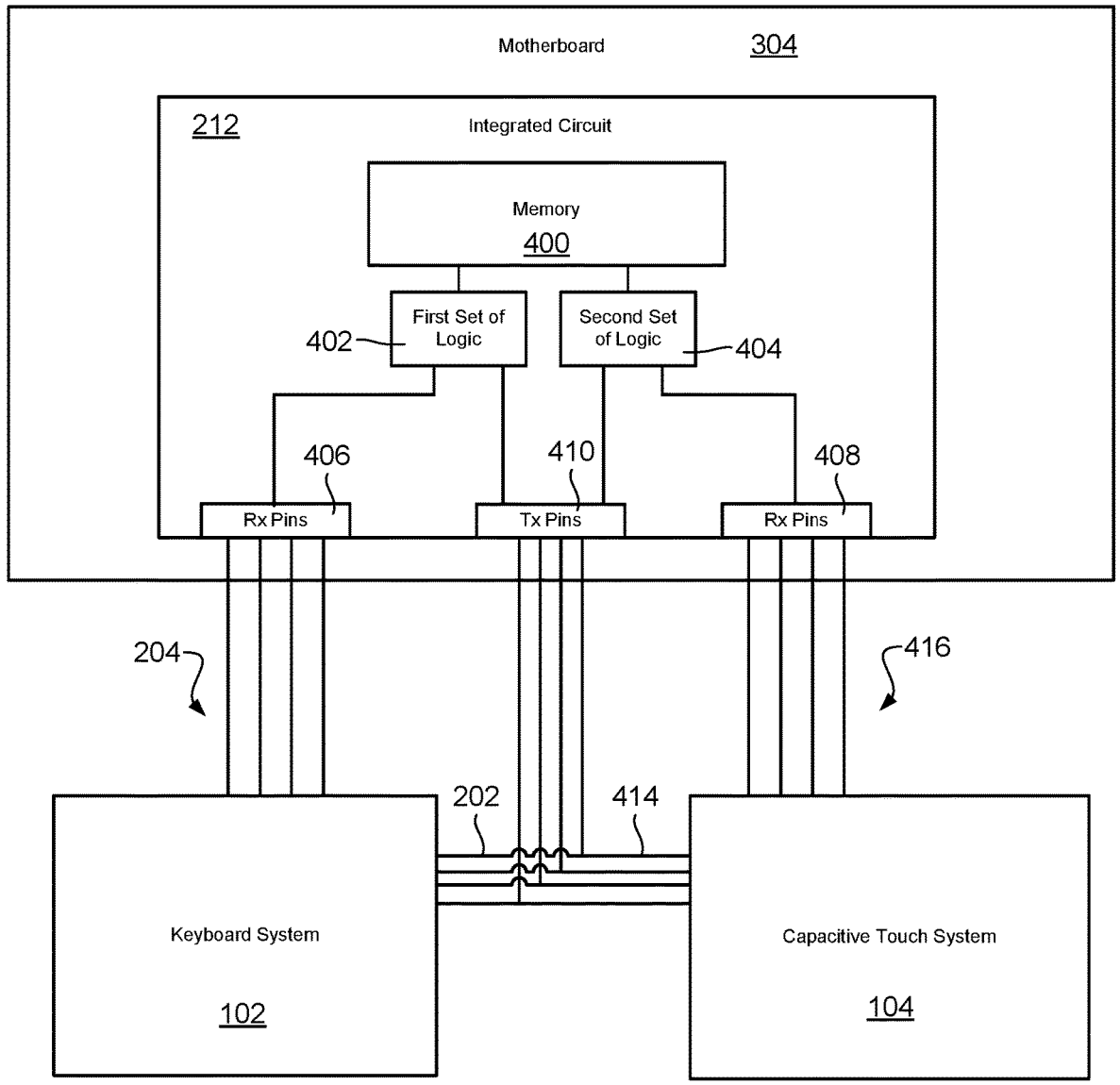
FIG. 5 depicts an example of a keyboard and a touchpad in communication with an integrated circuit according to the present disclosure.

FIG. 5 depicts an example of an integrated circuit 212 located on the motherboard 304. In this example, the first set 402 and the second set 404 of logic is connected to a third set 410 of input/outputs (Tx Pins). In this example, at least some of the keyboard transmit lines 202 and the touch transmit lines 414 are combined such that they are energized at the same time. In such an example, at least some of the keyboard transmit lines 202 and the touch transmit lines 414 sequenced together.

Figure 6:
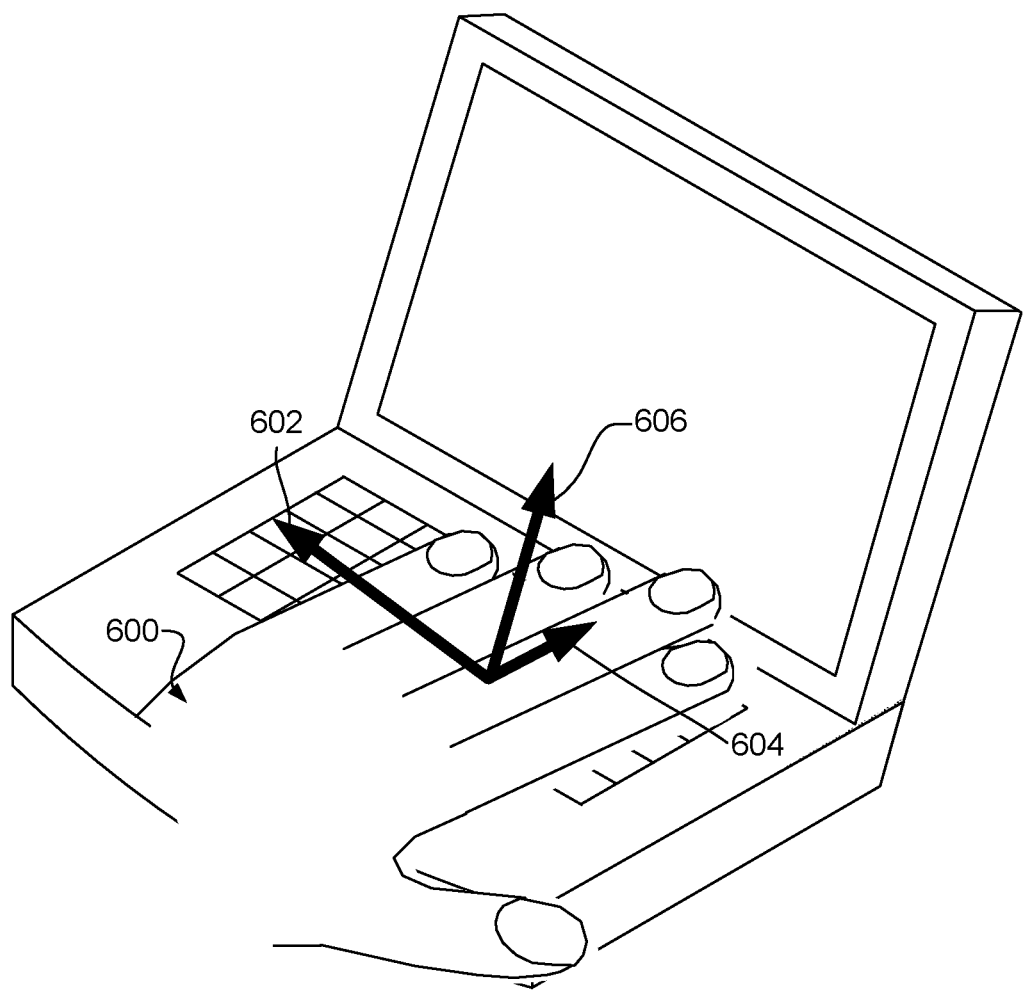
FIG. 6 depicts an example of hand gesture over a keyboard according to the present disclosure.

FIG. 6 depicts an example where a hand gesture 600 is performed over a keyboard 102 in accordance with the principles described herein. As indicated in the description of FIG. 2, the keyboard transmit line 202 and the keyboard sense line 204 can be used as electrodes to sense changes in capacitance due to the proximity of a conductive object, such as a hand or finger, proximate the keyboard when the switches are open. The capacitive sense logic connected to the keyboard's electrodes enables the detection of hand gestures over the keyboard.

Any appropriate type of hand gesture 600 may be detectable over the keyboard 102. The hand gesture 600 may be recognized through a motion over the keyboard 102 based, at least in part, on movement along a direction 602 aligned with the length of the keyboard 102, a direction 604 aligned with the width of the keyboard 102, a vertical direction 606 in relation to the keyboard 102, a direction diagonal to the keyboard, another direction, another type of movement, or combinations thereof. In some cases, the hand gesture may include a U-shaped movement, a circular movement, an angled movement, an L-shaped movement, a spiral movement, a diagonal movement, a vertical movement, a lateral movement, zig zagged movement, a continuous movement, a tapping movement, a waving movement, a discontinuous movement, a pinching movement, an asymmetric movement, a clapping movement, another type of movement, or combinations thereof. The hand gesture 600 may be performed with a single hand, two hands, multiple hands, or combinations thereof.

In some cases, the hand gesture 600 is detectable when the gesture is performed close to the keys of the keyboard 102. In other examples, the hand gesture may be detectable when the gesture is positioned within a three dimensional space defined by the length of the keyboard 102, the width of the keyboard 102, and the height of the computing device's display 106.

In some cases, the two-dimensional location of the hand gesture 600 may determine the type of action that is to be executed. For example, a hand gesture 600 performed over the right side of the keyboard may trigger a different action than if that hand gesture was performed over the left side or the middle side of the keyboard 102.

In some cases, the three-dimensional location of the hand gesture 600 may determine the type of action that is to be executed. For example, a hand gesture 600 performed within millimeters over the keyboard may trigger a different action than if that hand gesture 600 was performed at an elevation of approximately half of the height of the display or even at an elevation of approximately the entire height of the display 106.

The hand gesture 600 may be used to execute any appropriate type of action in the computing device. For example, the hand gesture may be used to execute at least one of the actions from the following non-exhaustive list, but not limited to changing a power mode, turning a computer on/off, initiating a sleep mode, reducing the number of processes being operated on the computer, initiating a power savings mode, increasing the performance of the computing device, sending instructions to a program being operated by the computing system, opening/closing programs, saving documents, printing documents, sending an email, drafting text, creating a picture, copying and pasting functions, changing a display setting, changing an audio setting, activating a backlight system, deactivating a backlight system, moving a cursor, selecting an object in the display, other types of actions, or combinations thereof.

Figure 7:
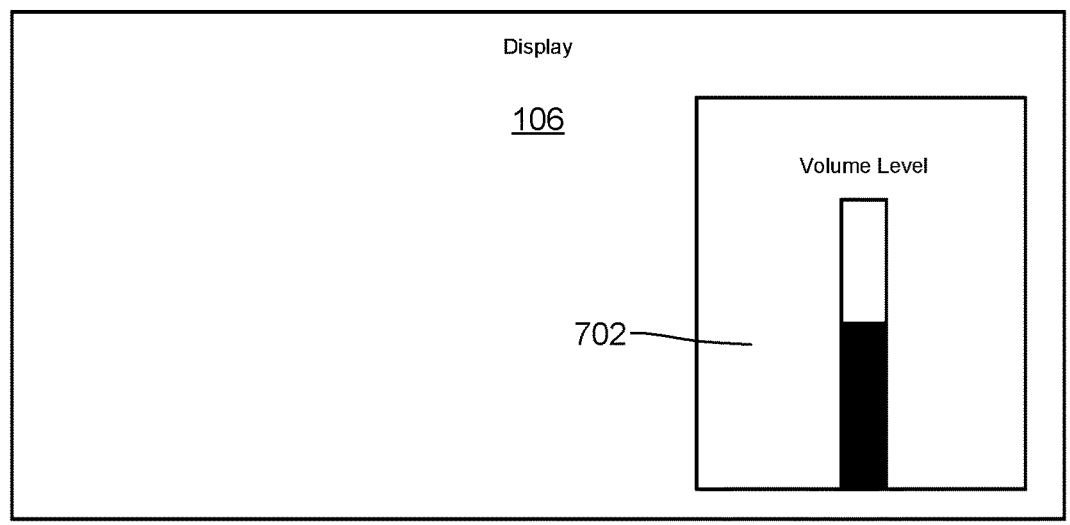
FIG. 7 depicts an example of hand gesture triggering an action over a keyboard according to the present disclosure.
Figure 7:
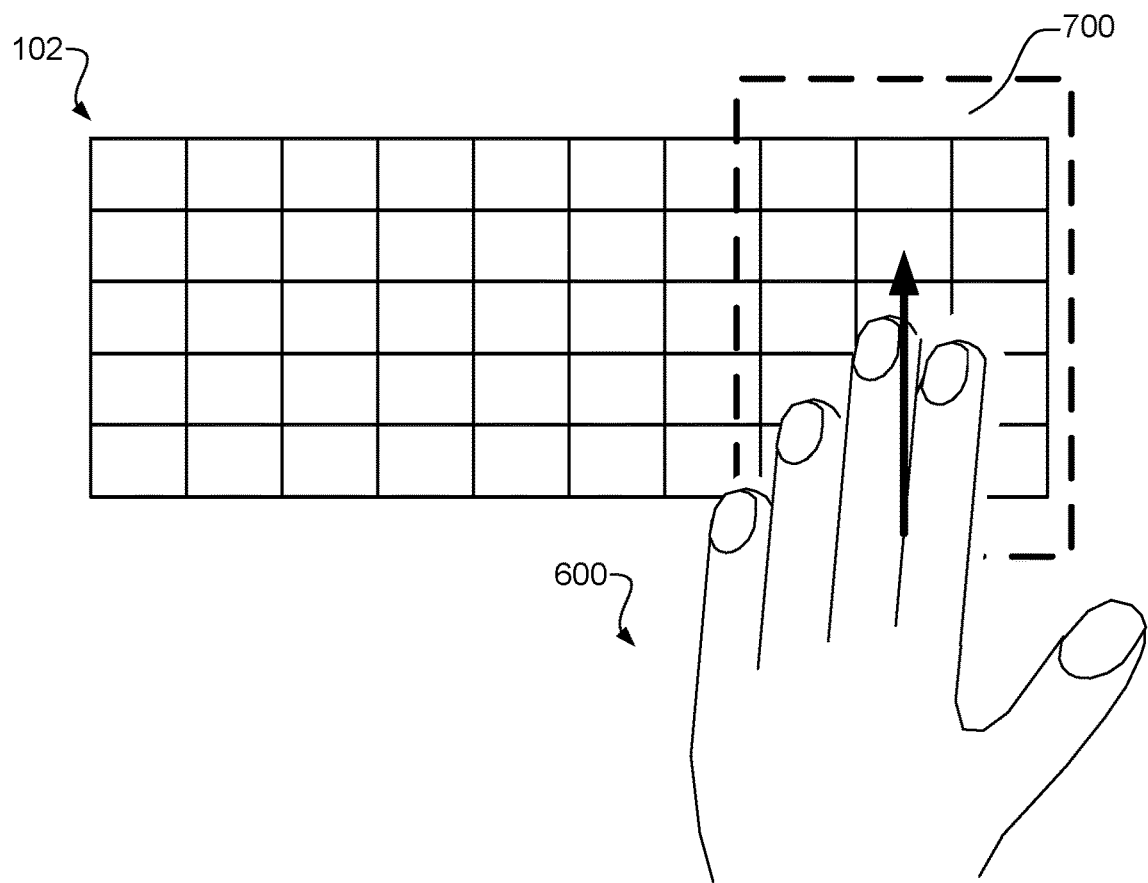

FIG. 7 depicts an example of a hand gesture 600 over a first area 700 of the keyboard 102 located on a right hand side of the keyboard 102. In this example, the hand gesture 600 triggers a presentation of an audio level indicator 702 in the display 106. In response to displaying the volume level indicator 702, the user may raise or lower his or her hand to raise or lower the audio level accordingly. In some cases, the user may back his or her hand out to close the volume level indicator 702.

Figure 8:
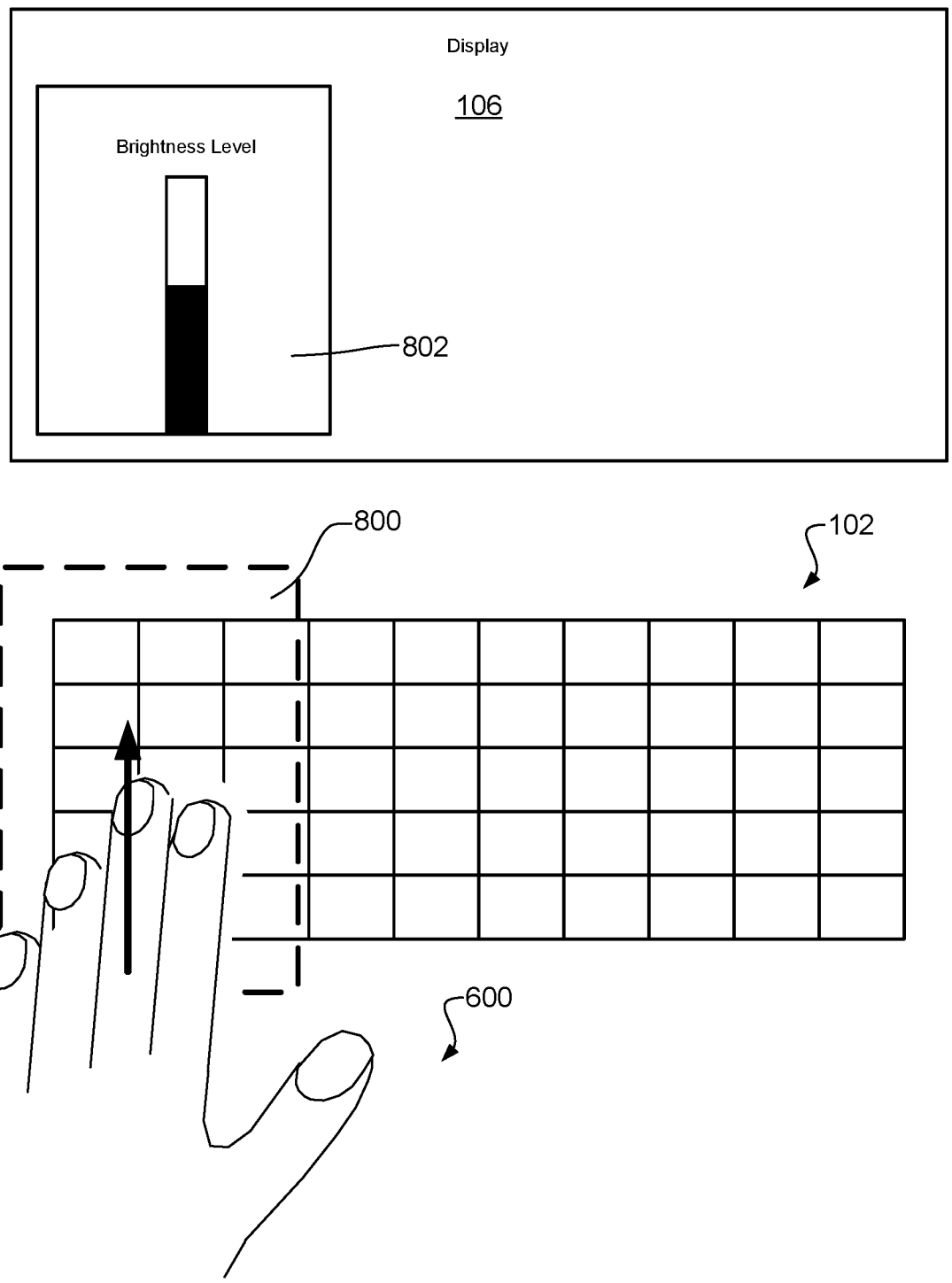
FIG. 8 depicts au example of hand gesture triggering an action over a keyboard according to the present disclosure.

FIG. 8 depicts an example of a hand gesture 600 over a second area 800 of the keyboard 102 located on a left hand side of the keyboard 102. In this example, the hand gesture 600 triggers a presentation of a screen brightness indicator 802. In response to displaying the screen brightness indicator 802, the user may raise or lower his other hand to brighten or dim the screen brightness accordingly. In some cases, the user may back his or her hand out to close the screen brightness indicator 802.

Figure 9:
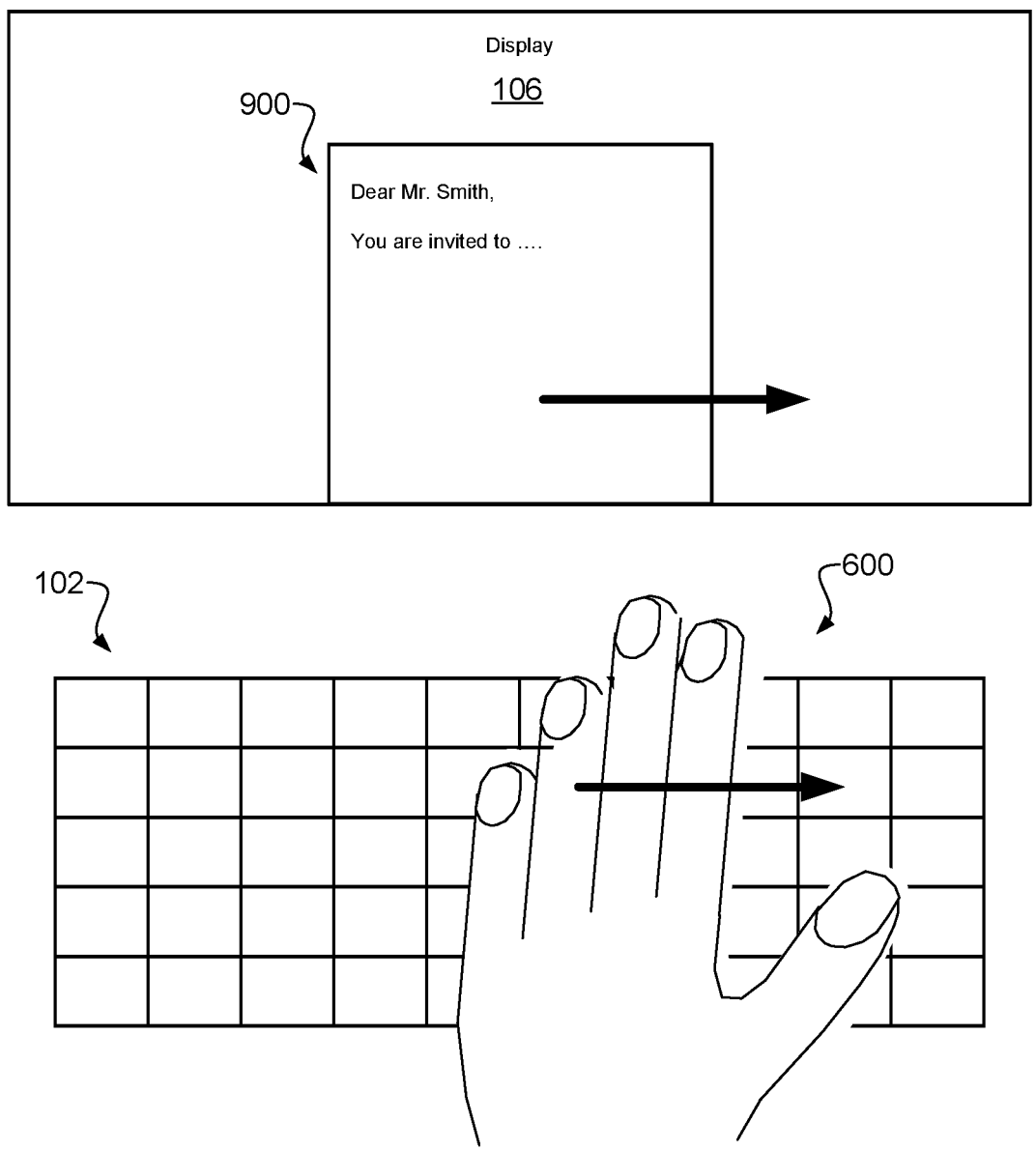
FIG. 9 depicts an example of hand gesture triggering an action over a keyboard according to the present disclosure.

FIG. 9 depicts an example of a user swiping his or her hand along at least a portion of the length of the keyboard 102. In this example, this hand gesture 600 may cause an open document 900 to be moved to the side, minimized, closed, saved, otherwise controlled, otherwise affected, or combinations thereof. In some cases, the user may cause the opposite action by moving his or her hand back in the opposite direction. For example, if swiping a hand to the right causes the document 900 to close, swiping the hand to the left may cause the document 900 to open.

Figure 10:
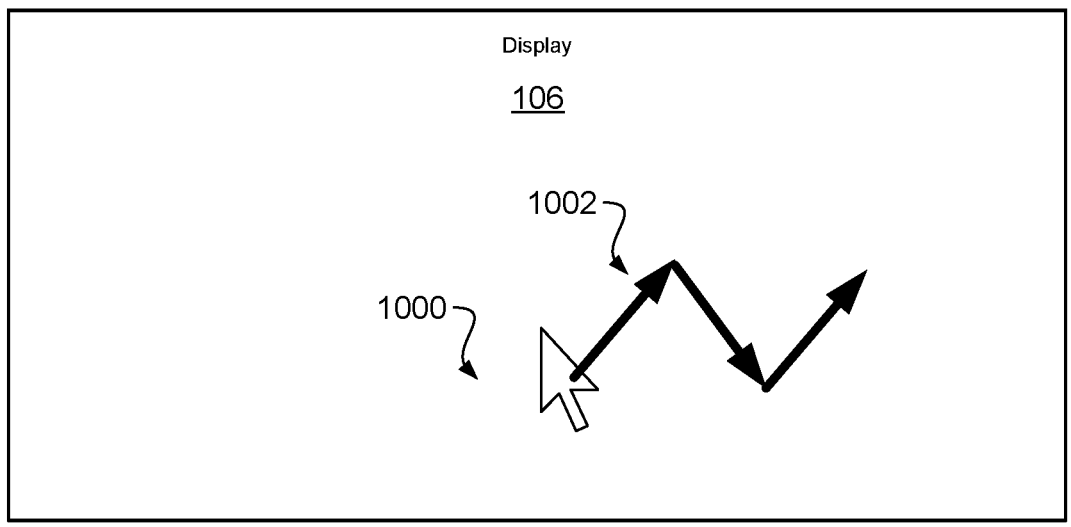
FIG. 10 depicts an example of hand gesture triggering an action over a keyboard according to the present disclosure.
Figure 10:
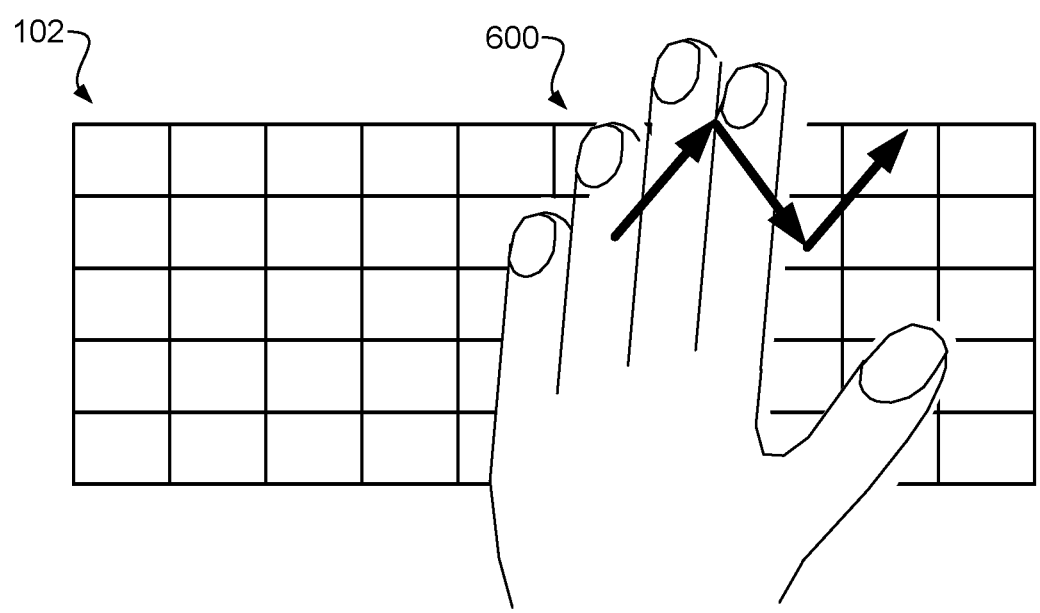

FIG. 10 depicts an example of a hand gesture 600 triggering an action of moving a cursor 1000. In this example, the user moves his or her hand in a zag zagged movement 1002, and the cursor 1000 follows by moving in a zag zagged movement 1002.

Figure 11:
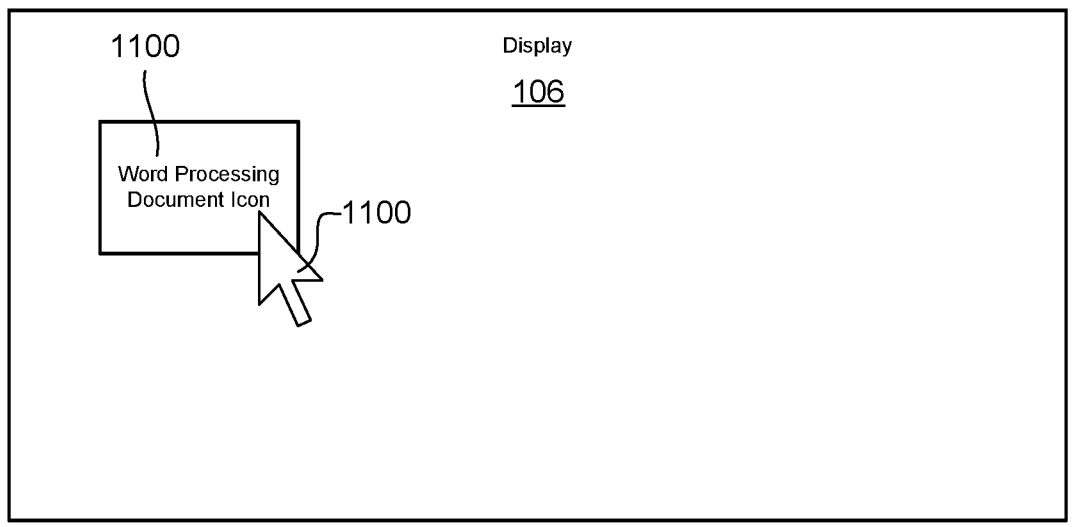
FIG. 11 depicts an example of hand gesture triggering an action over a keyboard according to the present disclosure.
Figure 11:
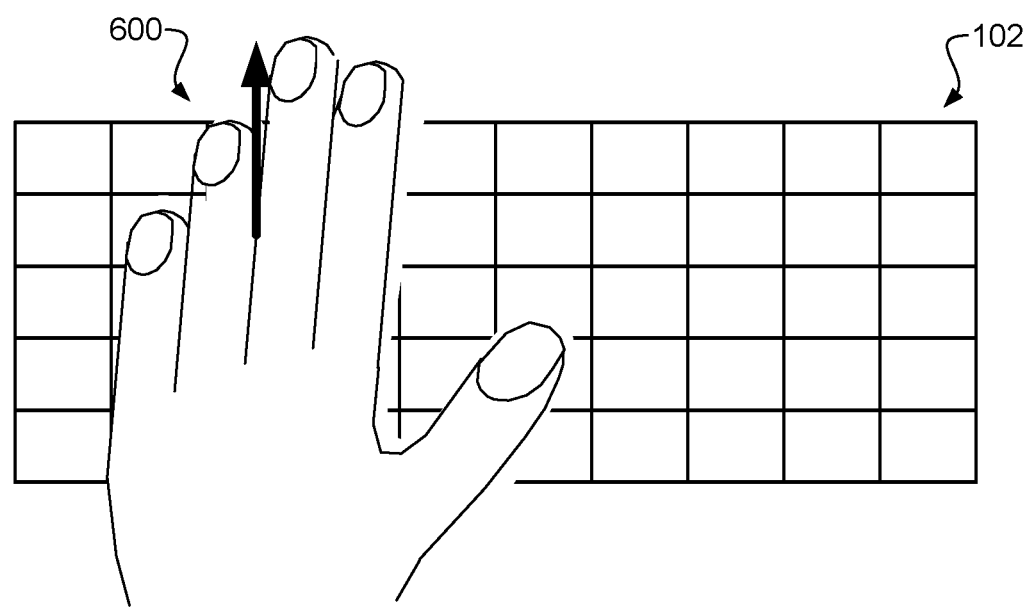

FIG. 11 depicts an example of selecting an object 1100 in a display 106 of the computing device with a hand gesture performed over the keyboard 102. In this example, the user may perform a first hand gesture that locks the movement of the cursor 1000 to the user's hand movement. Then the user may cause the cursor 1100 to move to the object 1100 by performing a second gesture. Then the user may perform a third gesture to select the object 1100. In some examples, the object 1100 is a program icon and selecting the object 1100 may cause the program to open or otherwise perform a task. After selecting the object 1100, the user may continue to move the cursor 1000 with a fourth gesture. When desired, the user may perform a fifth gesture to cause the cursor to unlock from the user's hand movement. In some examples, the gestures mentioned above or other gestures may be identified by the same movement, different movements, the same locations, different locations, or combinations thereof.

Figure 12:
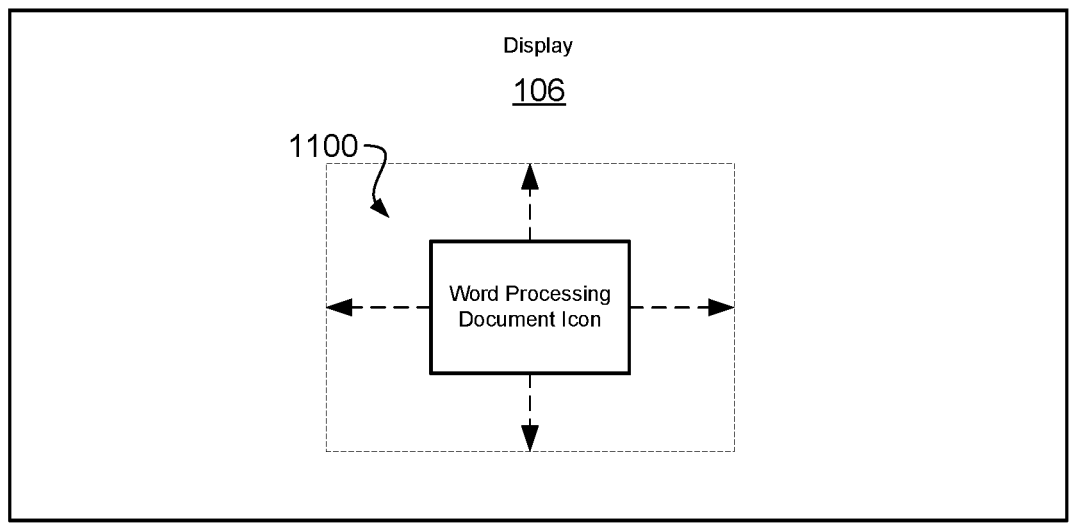
FIG. 12 depicts an example of hand gesture triggering an action over a keyboard according to the present disclosure.
Figure 12:
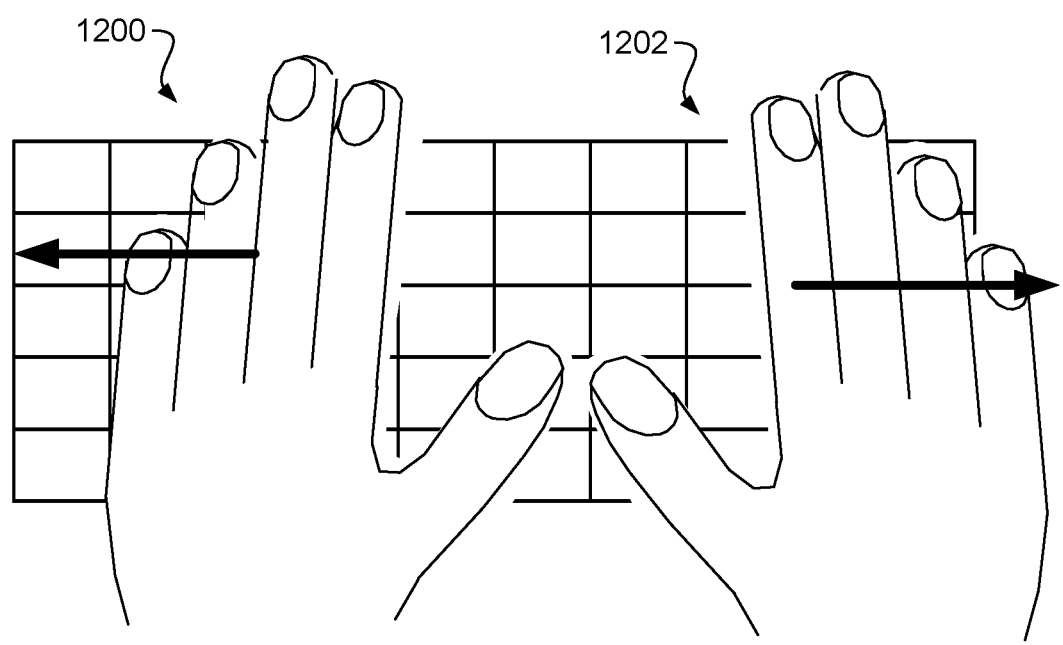

FIG. 12 depicts an example of using a first hand 1200 and a second hand 1202 to perform a gesture. In the example illustrated in FIG. 12, the first and second hands 1200, 1202 are moving apart and causing an object in the display 106 to expand. In other examples, the first and second hands 1200, 1202 may move closer together to cause the object to shrink.

Figure 13:
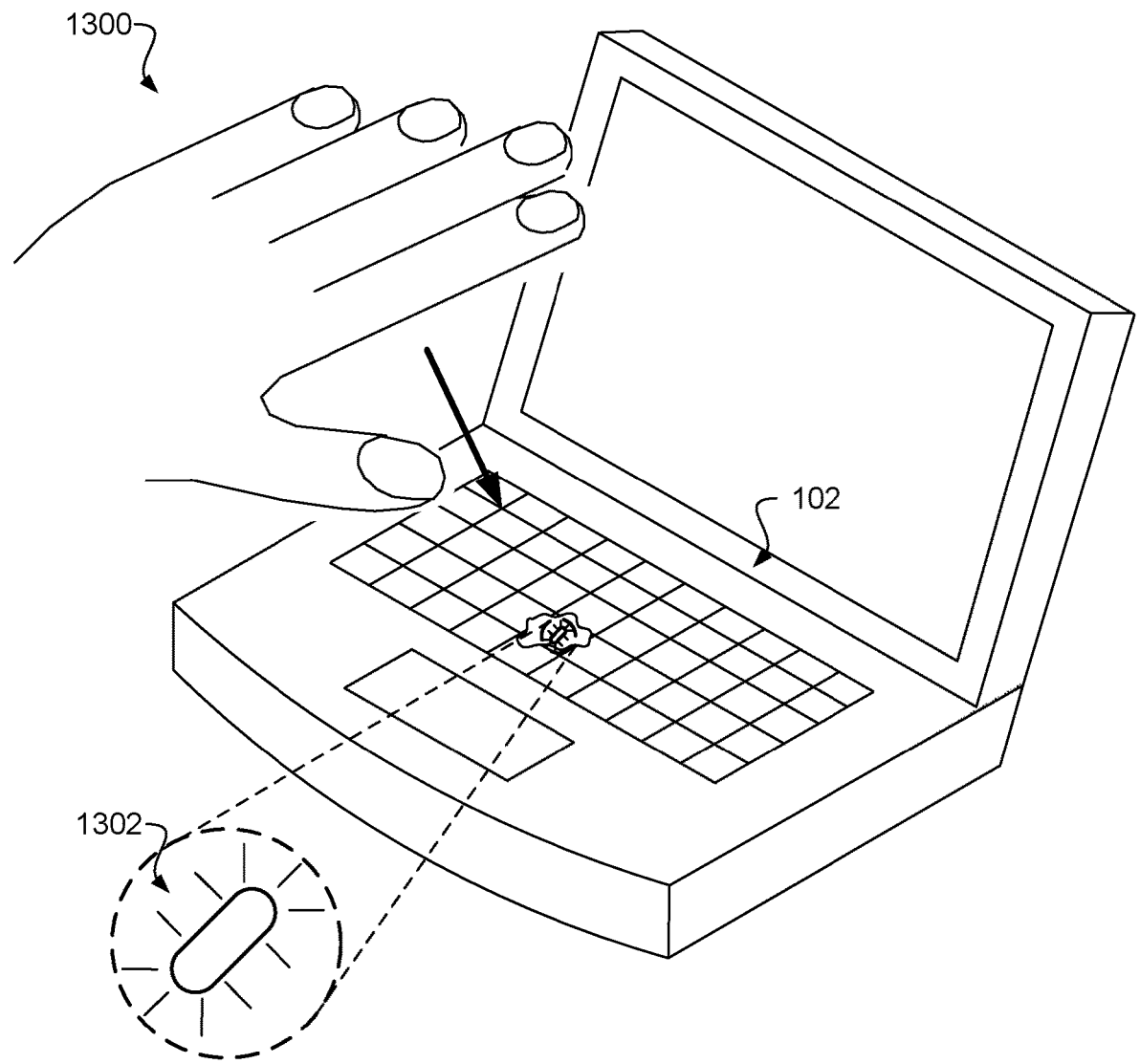
FIG. 13 depicts an example of hand gesture triggering an action over a keyboard according to the present disclosure.

FIG. 13 depicts an example of a hand gesture of a hand 1300 approaching the keyboard 102. In response to this gesture, the triggered action may be energizing at least one backlight associated with the keyboard 102. In this example, an LED 1302 incorporated into the keyboard 102 may be activated. In some cases, the backlight may remain on as long as any movement is detected through either the proximity sensing features of the keyboard or through the switch sensing features of the keyboard. After a predetermined time period of no movement, the backlight may turn off.

Figure 14:
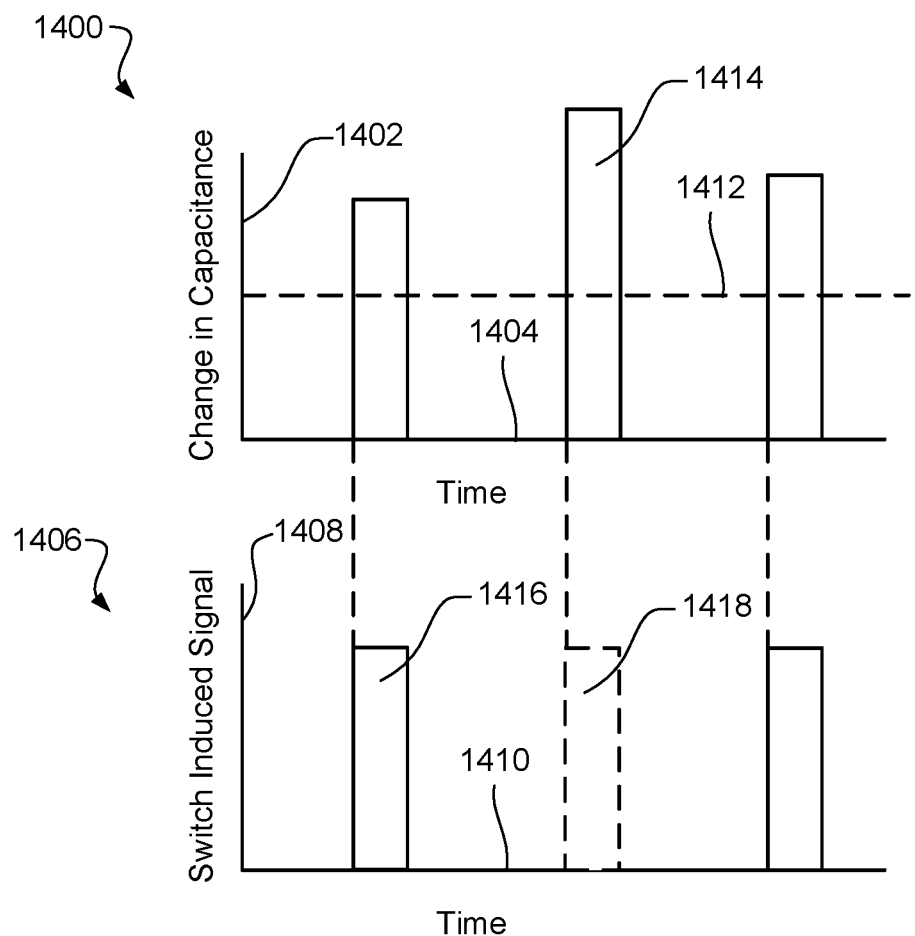
FIG. 14 depicts an example of identifying a keyboard failure to identify a key depression according to the present disclosure.

FIG. 14 depicts an example using the proximity sensing features of the keyboard 102 as a backup to the switch circuitry. A non-exhaustive list of reasons why the keyboard switch may fail include, but is not limited to, wear on the mechanical components of the switch, a broken mechanical component, dirt or other debris preventing the formation of an electrical connection between the transmit and sense lines when the key is depressed, contamination of the circuitry from mineral water or other types of liquids that leave electrically conductive deposits on the circuit after the liquid have evaporated, other reasons, or combinations thereof.

FIG. 14 depicts measurements that may be processed by both the proximity logic and the switch logic when a key is depressed. In the first chart 1400, the y-axis 1402 represents a changes in capacitance, and the x-axis 1404 represents the passage of time. In the second chart 1406, the y-axis 1408 represents a switch induced signals, and the x-axis 1410 represents the passage of time. Both the proximity sensing logic and the switch logic should receive a signal at the same time. As a finger approaches the top of the key, the capacitance may increase exponentially causing a sharp rise in capacitance just before the switch closes triggering an additional signal in the switch logic. In this example, there may be a capacitance threshold 1412, that when crossed, correlates to a key depression. As a result, the proximity sensing logic may determine that the when that threshold is crossed that the key is depressed.

As depicted in FIG. 14, a capacitive event 1414 of crossing the threshold 1412 corresponds with a switch event 1416 at the same moment in time. In this example, an event detection failure 1418 is depicted when the capacitive threshold is crossed, but no switch event is measured.

Figure 15:
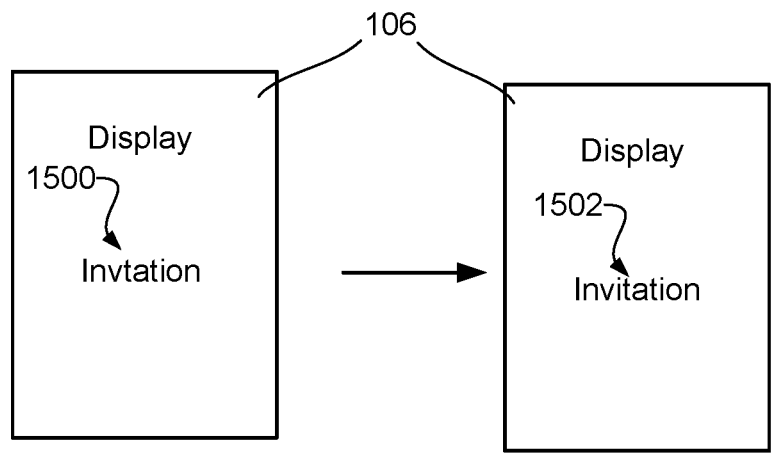
FIG. 15 depicts an example of consulting a program operating on a computing device to assist in a determination that a key depression failed to be detected according to the present disclosure.

In this example, the logic may determine that a key depression occurred and send instructions that the key depression event occurred. In another event, the logic may consult with external evidence that the key was depressed or not depressed. One example of external evidence may be to consult with the programs operating on the computing device. In an example where a word processing program is taking the inputs from the integrated circuit to spell a word, the logic may reference the spelling of the words based from the sequence of key depressions. In the example of FIG. 15, the word "invitation" 1500 is misspelled, and that the key depression failure is associated with the key representing "i" in a sequence between the keys associated with the letters "v" and "t." In this case, the logic may determine that the key was depressed, and a send appropriate instructions so that the misspelled word is changed to the correct spelling 1502. However, if the consultation indicates that the word was spelled correctly, the logic may determine that the capacitance measurement was a false positive and that no key depression occurred.

Figure 16:
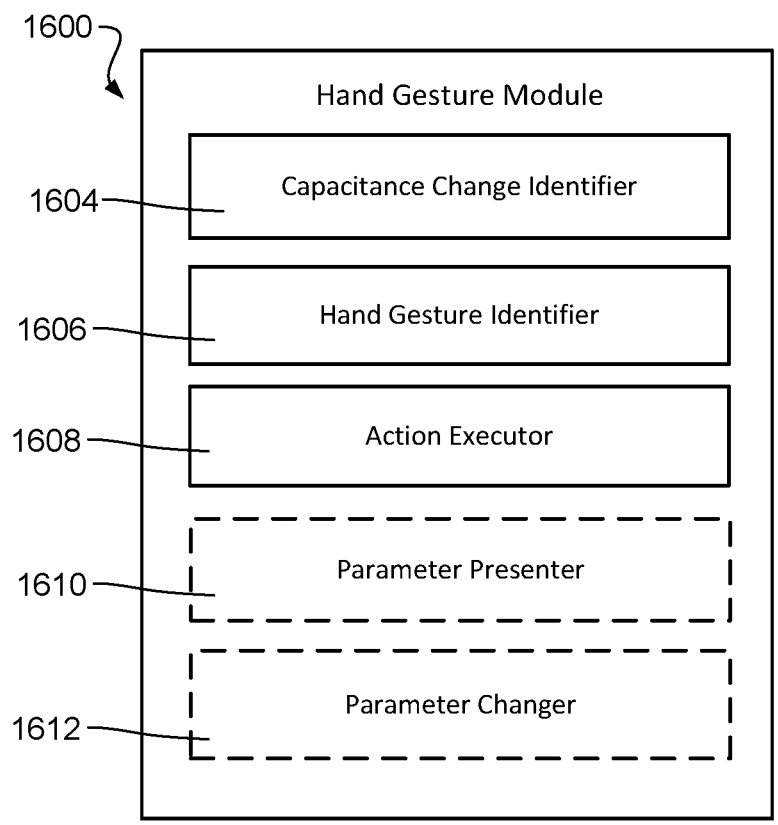
FIG. 16 depicts an example of a hand gesture module according to the present disclosure.

FIG. 16 depicts an example of a hand gesture module 1600. In this example, the hand gesture module 1600 includes programmed instructions in memory and may include associated firmware, logic, processing resources, memory resources, power sources, processing resources, hardware, or other types of hardware to carry out the tasks of the hand gesture module 1600. The hand gesture module 1600 includes a capacitance change identifier 1604, a hand gesture identifier 1606, and an action executor 1608.

The capacitance change identifier 1604 may identify that a change in capacitance is occurring between the keyboard's transmit line and the keyboard's sense line while the associated switch is still open. In one example, the switch may be a dome switch, a galvanic switch, a mechanical switch, a membrane switch, another type of switch, or combinations thereof.

As a hand, finger, or another conductive object approaches the intersection of a transmit line and a sense line, the capacitance value between the transmit line and the sense line changes when the switch remains open. This change in capacitance can be measured on the sense line. When the switch closes in response to the depression of the associated key, the electrical properties of the sense line also change. For example, the voltage on the sense line may change. The changes in the electrical properties of the sense line in response to the change in capacitance due to the proximity of the hand, finger, or other conductive object are different from the electrical property changes that result when the switch closes. These differences are distinguishable allowing the capacitance changer identifier 1604 to distinguish between a change when the switch is open and a change when the switch closes.

The hand gesture identifier 1606 may identify the hand gesture being made. Recognition of the hand gesture's identity may depend on the type of movement performed by the hand or other type of conductive object. In some cases, the hand gesture's identity is based on the location that the gesture is performed in either three-dimensional space or two dimensional space. In some cases, the type of movement and location of the gesture are used to determine the identity of the hand gesture.

In one example, a first type of gesture may be identified as a swiping motion when a first sense line associated with a first key on the right hand side of the keyboard has a change in capacitance due to the proximity of the user's hand at a first moment in time which is followed by the sense lines associated with a row keys to the first key's left experiencing similar changes in capacitance. Another sequence of sense lines affected by a change in capacitance associated with a different sequence ok keys may be indicative of another type of gesture. In another example, a gesture may be identified by the changes in capacitance changing in specific patterns. For example, as a user's hand approaches the keyboard, the change in capacitance may increase at a rate, and as the user's hand moves away from the keyboard, the change in capacitance may decrease at a rate. The patterns associated with changes in capacitance may be used to identify the hand gesture. In some cases, a combination of the key sequence and the type of capacitance change patterns may be used to identify the hand gestures.

The action executor 1608 may cause the action associated with the identified hand gesture to be executed. In some examples, certain hand gestures performed in a sequence may trigger different actions even though those same gestures would not be triggered if they were performed out of sequence. For example, a gesture to cause the cursor to move may be followed by a gesture to select an object in the display. The gesture to select the object may trigger a different action if the cursor had not already been locked to the movement of the user's hand. Any appropriate type of action may be triggered by the action executor 1608. In some cases, the actions are associated with the gestures described in conjunction with FIGS. 6-13.

In some examples, the hand gesture module may include specific modules that are examples of the action executor, such as a parameter presenter 1610 and a parameter changer 1612. Other examples of the action executor may be embodied as specific modules.

In examples with a parameter presenter 1610, the parameter presenter 1610 may cause a level indicator to be presented in the display of the computing device based on a first gesture, and the parameter changer may cause the displayed level to change based on a second gesture.

Figure 17:
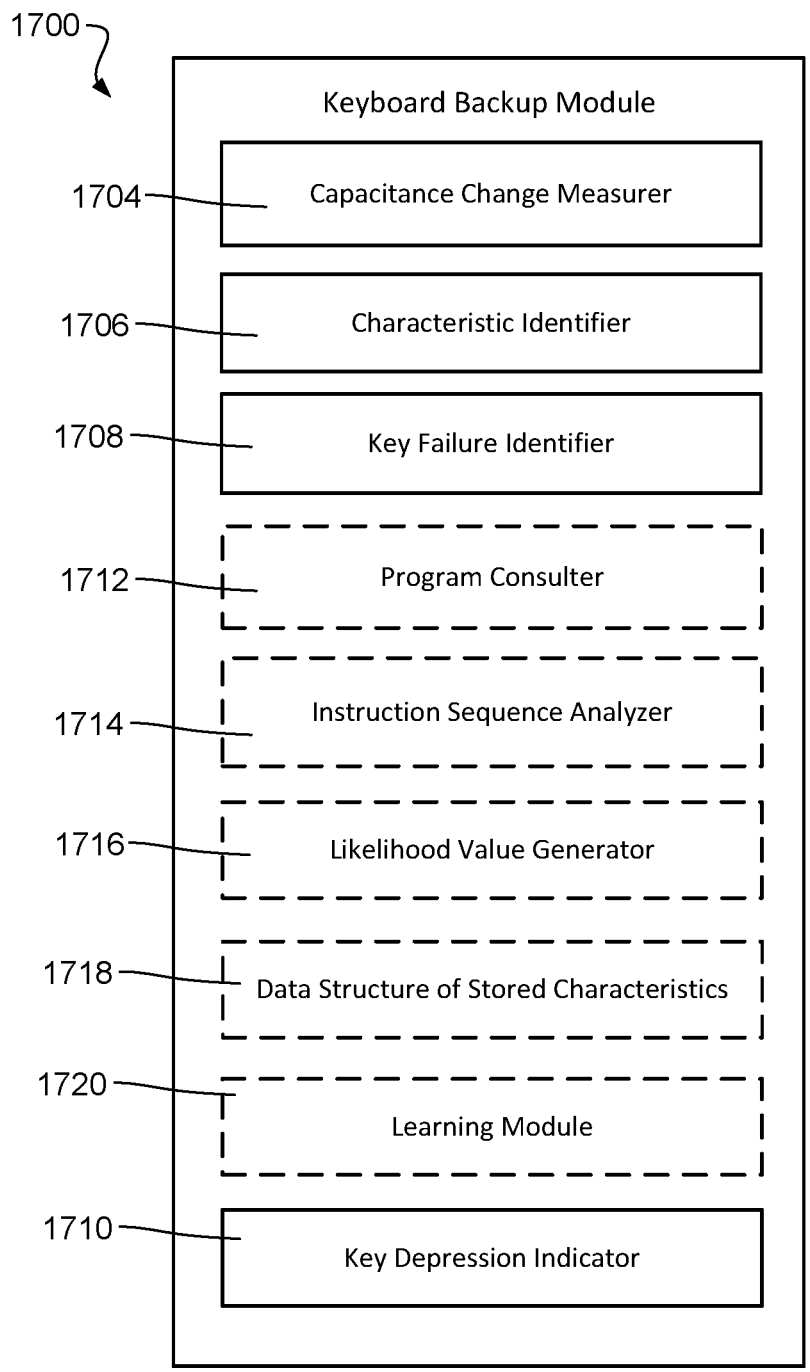
FIG. 17 depicts an example of a keyboard backup module according to the present disclosure.

FIG. 17 depicts an example of a keyboard backup module 1700. In this example, the keyboard backup module 1700 includes programmed instructions in memory and may include associated firmware, logic, processing resources, memory resources, power sources, processing resources, hardware, or other types of hardware to carry out the tasks of the keyboard backup module 1700. The keyboard backup module 1700 includes a capacitance change measurer 1704, a characteristic identifier 1706, a key failure identifier 1708, and a key depression indicator 1710.

The capacitance change measurer 1704 may measure a change in the electrical characteristics of the sense electrodes in the grid underneath the keyboard's arrangement of keys. As a hand, finger, or another conductive object approaches the intersection of a transmit line and a sense line, the capacitance value between the transmit line and the sense line changes when the switch remains open. This change in capacitance can be measured on the sense line by the capacitance change measurer 1704.

The characteristic identifier 1706 may determine that the characteristic of the measured change is indicative of a key depression. For example, as a finger depresses the key, the associated capacitance change in the sense line also increases. In some cases, at the bottom of the key depression, the finger may get as close as possible to the intersection between the associated transmit line and sense line resulting in the greatest change in capacitance based on proximity. This change in capacitance value may be predictable such that this change value is correlated with a key depression. In some cases, when this correlated change in the capacitance value is reached, a conclusion may be made that the key was depressed regardless of whether the switch closes. In some cases, the correlated change does not have to be reached for the before the processing resources determine that the key is depressed.

The key failure identifier 1708 may determine that the switch logic failed to identify that the key was depressed if the situation where the change in capacitance indicates a key depression and the switch logic fails to identify the key depression. The key failure identifier 1708 may determine that the key was depressed when a change in capacitance crosses a threshold that correlates with a key depression, but the electrical characteristics of the sense line associated with the key does not exhibit characterisitics indicative of the switch closing.

The key depression indicator 1710 may indicate that the key is depressed. The key indicator may cause that the sequence of key depressions sent from the logic includes the failed key depression. The key depression indicator 1710 may send information that corrects a sequence of key strokes that were actually depressed to fill in the gaps of the missing key strokes.

In some examples, the keyboard backup module 1700 may include any from the non-exhaustive list of a program consulter module 1712, an instruction sequence analyzer module 1714, a likelihood valve generator module 1716, a data structure of stored characteristics 1718, and a learning module 1720.

The program consulting module 1712 may cause the logic to consult with a program being operated on the computing device to assist in determining whether the key depression failure is correct. The instruction sequence analyzer module 1714 may analyze the sequence of keys depressed to determine whether it is likely that the key was depressed. If the sequence of keys indicates that words or other types of instructions are misspelled or out of a correct manner, the likelihood generator module 1716 may assign a high likelihood value that the key was depressed. In some cases, the sequence analyzer module may present a set of circumstances that are not clear, which may cause the likelihood generator module 1716 to assign a low likelihood value to the whether the key failure is correct. The system may classify the incident as a key depression or not depending on the assigned likelihood value.

The data structure may include electrical characteristics, such as capacitance characteristics that resemble when a key is a depressed. For example, the data structure may include a capacitance value threshold to be crossed to indicate that a key is depressed. The data structure may also include a capacitance change curve that matches the profile of a key depression. The data structure may also include profiles that are likely to occur when a mechanical switch is broken, when liquid has been spilled into the keyboard, and other types of situations may result in keyboard malfunctions.

The learning module 1720 may analyze when key failure detection has been correct and when key failure has not been correct. The learning module 1720 may learn that the threshold level is too low and cause the threshold level to increase. In some cases, the learning module 1720 may determine that certain user actions that affect capacitance, like sticking paperclips or coins in his or her keyboard, do not represent a key depression because the capacitance change profile or another electrical characteristic. In cases where these situations may be disguisable from a key depression, the learning module may add profiles and characteristics that help determine whether a key depression occurred.

In some cases, different users may cause different amounts of change in the capacitance based on individual characteristics, such as the user's hydration levels, finger size, finger length, other factors, or combinations thereof. These changes may make it desirable to change the capacitance change threshold level to change based on different users. The learning module 1720 may assist in identifying desirable changes in the threshold level.

Figure 18:
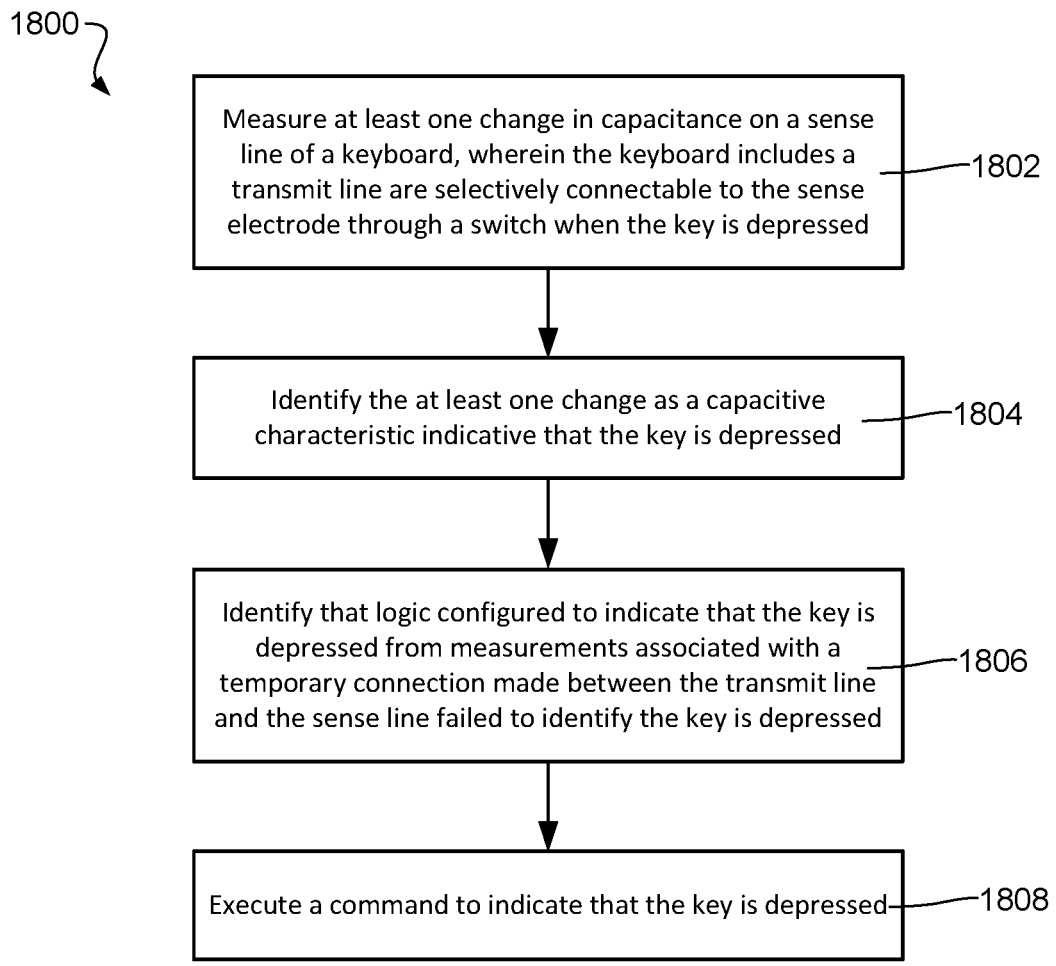
FIG. 18 depicts an example of identifying that a keyboard failed to identify a key depression event according to the present disclosure.

FIG. 18 depicts an example of a method 1800 identifying that a keyboard failed to identify a key depression event according to the present disclosure. This method 1800 may be performed based on the description of the devices, module, and principles described in relation to FIGS. 1-17. In this example, the method 1800 includes measuring 1802 at least one change in capacitance on a sense line of a keyboard where the keyboard includes a transmit line are selectively connectable to the sense electrode through a switch when the key is depressed, identifying 1804 the at least one change as a capacitive characteristic indicative that the key is depressed, identifying 1806 that logic configured to indicate that the key is depressed from measurements associated with a temporary connection made between the transmit line and the sense line failed to identify the key is depressed, and executing 1808 a command to indicate that the key is depressed.

Figure 19:
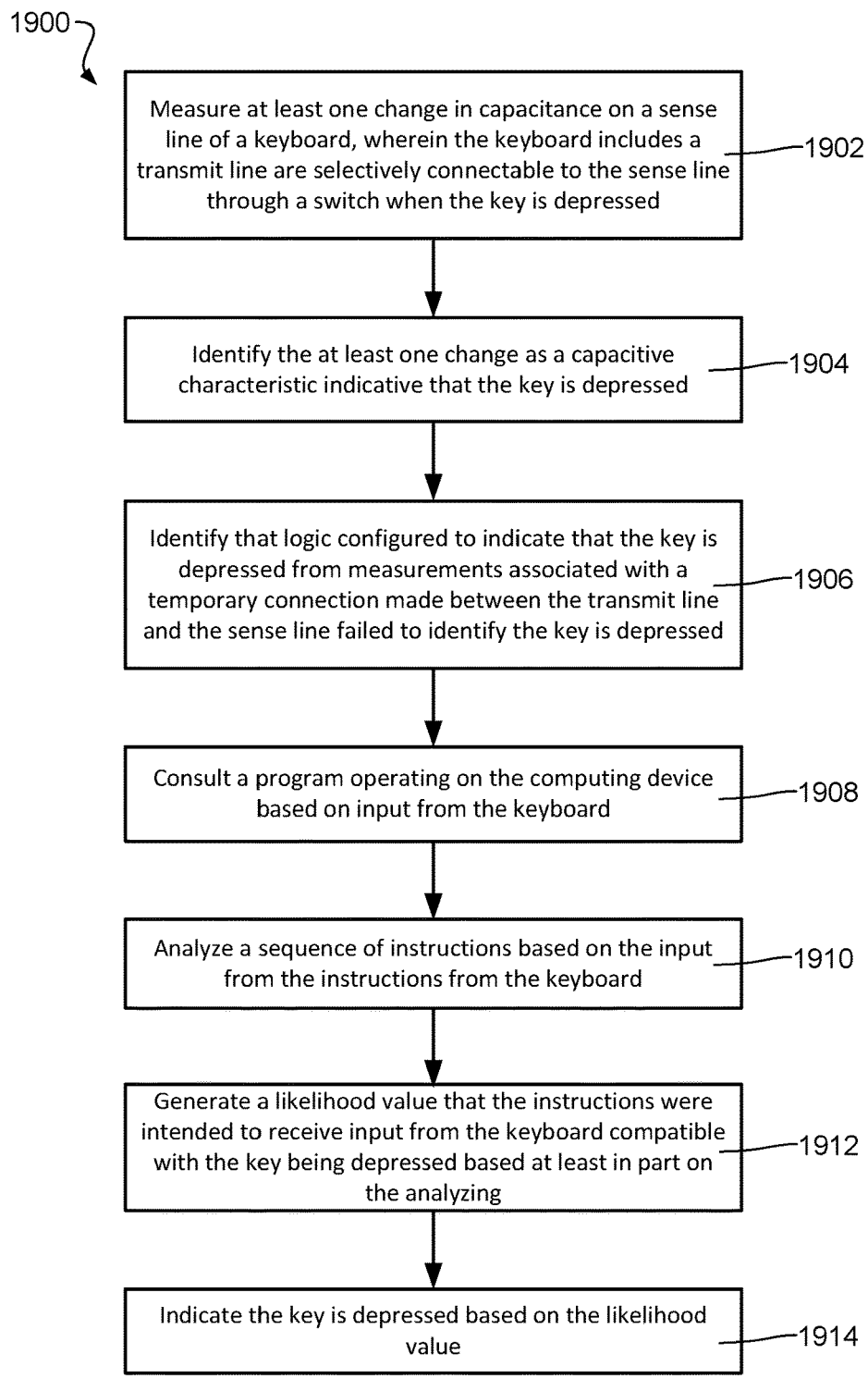
FIG. 19 depicts an example of identifying that a keyboard failed to identify a key depression event according to the present disclosure.

FIG. 19 depicts an example of a method 1900 of identifying that a keyboard failed to identify a key depression event according to the present disclosure. This method 1900 may be performed based on the description of the devices, module, and principles described in relation to FIGS. 1-17. In this example, the method 1900 includes measuring 1902 at least one change in capacitance on a sense line of a keyboard where the keyboard includes a transmit line are selectively connectable to the sense electrode through a switch when the key is depressed, identifying 1904 the at least one change as a capacitive characteristic indicative that the key is depressed, identifying 1906 that logic configured to indicate that the key is depressed from measurements associated with a temporary connection made between the transmit line and the sense line failed to identify the key is depressed, consulting 1908 a program operating on the computing device based on input from the keyboard, analyzing 1910 a sequence of instructions based on the input from the instructions from the keyboard, generating 1912 a likelihood value that the instructions were intended to receive input from the keyboard compatible with the key being depressed based at least in part on the analyzing, and indicating 1914 the key is depressed based on the likelihood value.

Figure 20:
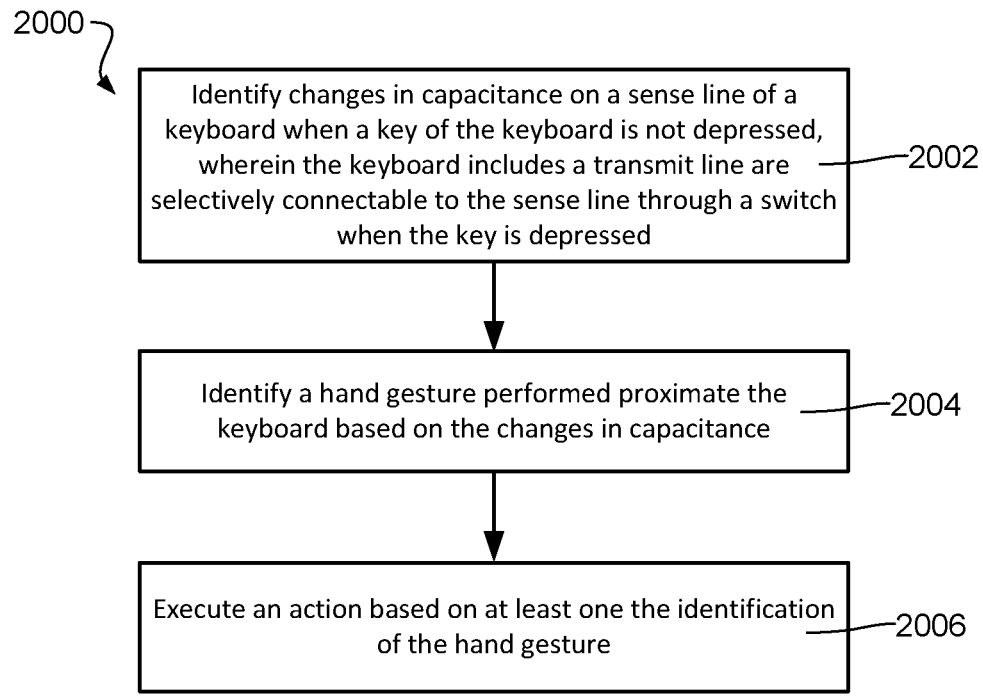
FIG. 20 depicts an example of trigging an action based on a hand gesture over a keyboard according to the present disclosure.

FIG. 20 depicts an example of a method 2000 of triggering an action based on a hand gesture over a keyboard according to the present disclosure. This method 2000 may be performed based on the description of the devices, module, and principles described in relation to FIGS. 1-17. In this example, the method 2000 includes identifying 2002 changes in capacitance on a sense line of a keyboard when a key of the keyboard is not depressed, wherein the keyboard includes a transmit line are selectively connectable to the sense line through a switch when the key is depressed; identifying 2004 a hand gesture performed proximate the keyboard based on the changes in capacitance; and executing 2006 an action based on at least one the identification of the hand gesture.

Figure 21:
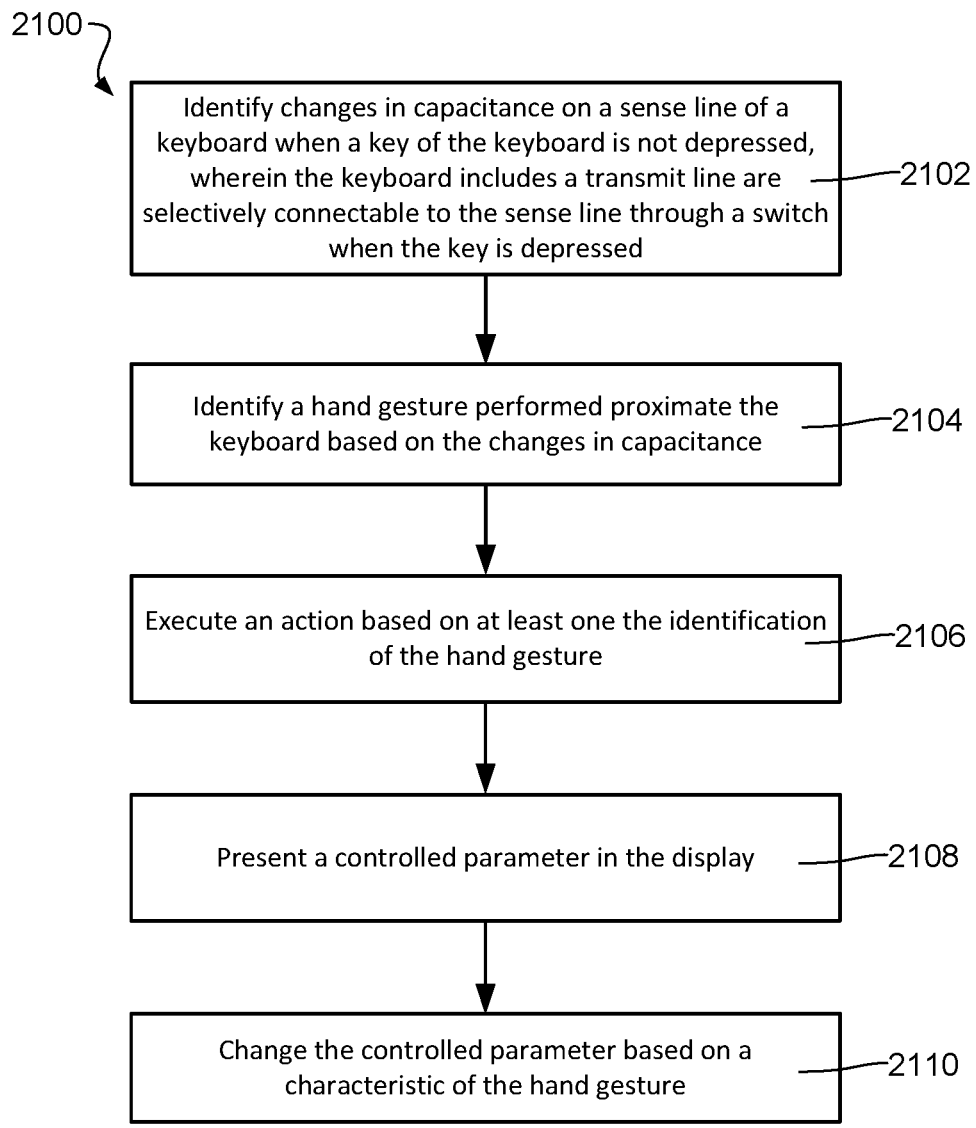
FIG. 21 depicts an example of trigging an action based on a hand gesture over a keyboard according to the present disclosure.
Figure 22:
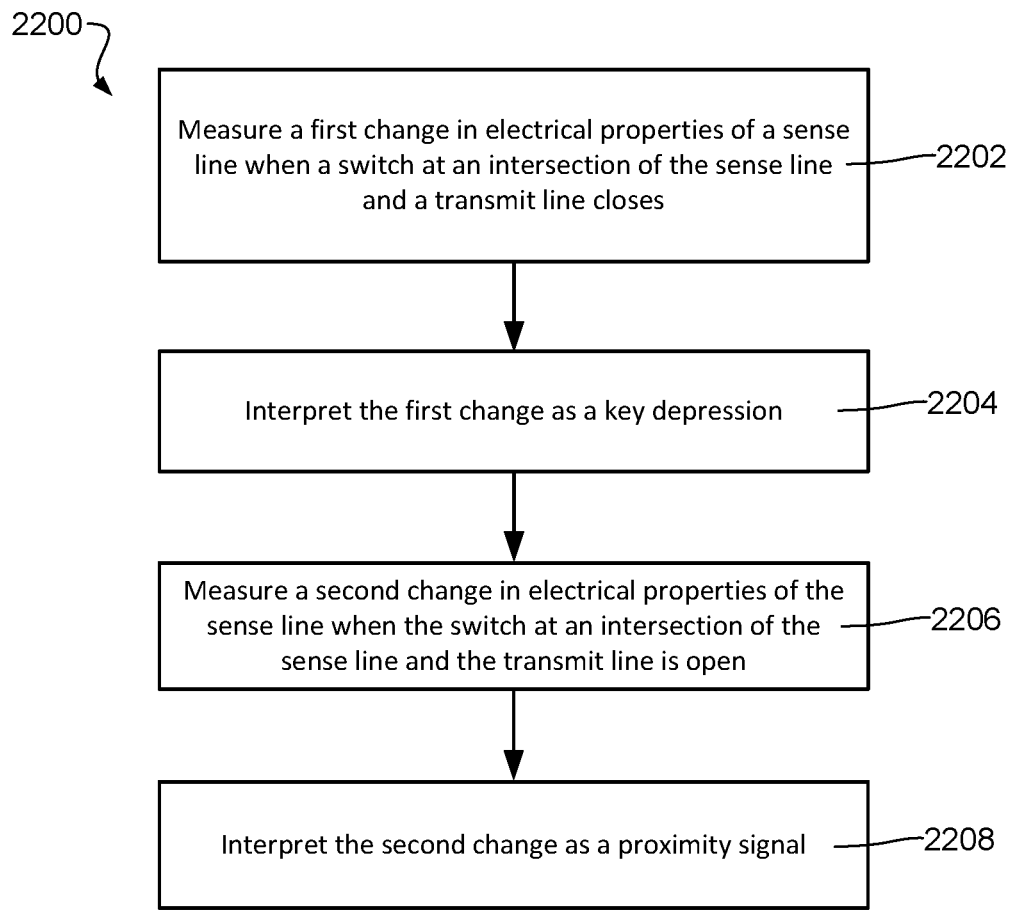
FIG. 22 depicts an example of operating a keyboard according to the present disclosure.

FIG. 21 depicts an example of a method 2100 of triggering an action based on a hand gesture over a keyboard according to the present disclosure. This method 2100 may be performed based on the description of the devices, module, and principles described in relation to FIGS. 1-17. In this example, the method 2100 includes identifying 2102 changes in capacitance on a sense line of a keyboard when a key of the keyboard is not depressed, wherein the keyboard includes a transmit line are selectively connectable to the sense line through a switch when the key is depressed; identifying 2104 a hand gesture performed proximate the keyboard based on the changes in capacitance; executing 2106 an action based on at least one the identification of the hand gesture; presenting 2108 a controlled parameter in the display; and changing 2110 the controlled parameter based on a characteristic of the hand gesture FIG. 22 depicts an example of a method 2200 of operating a keyboard according to the present disclosure. This method 2200 may be performed based on the description of the devices, module, and principles described in relation to FIGS. 1-17. In this example, the method 2200 measuring 2202 a first change in electrical properties of a sense line when a switch at an intersection of the sense line and a transmit line closes, interpreting 2204 the first change as a key depression, measuring 2206 a second change in electrical properties of the sense line when the switch at an intersection of the sense line and the transmit line is open, and interpreting 2208 the second change as a proximity signal.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A computing device, including:
a keyboard;
a switch in mechanical communication with an underside of a key arranged in the keyboard;
a processor;
a transmit line electrically connected to the processor;
a sense line electrically connected to the processor; and
the transmit line and the sense line selectively connectable through the switch when the key is depressed;
the transmit line and the sense line being configured to store capacitive energy between each other when the switch is open and the transmit line is energized;
memory in communication with the processor;
programmed instructions stored in the memory that, when executed, cause the processor to:
identify changes in capacitance from the sense line when the key is not depressed;
identify a hand gesture performed proximate the keyboard based on the changes in capacitance; and
execute an action based on at least one the identification of the hand gesture;
wherein the changes in electrical properties on the sense line due to closure of the switch from a key press are distinguishable from the changes in the capacitance electrical properties on the sense line when an electrical conductor is proximate the key and the switch is open such that the programmed instructions are configured to distinguish between these key press inputs and capacitance inputs and measure both the key press inputs and capacitance inputs from the same sense line.

2. The computing device of claim 1, wherein the action includes changing a power mode of the computing device.

3. The computing device of claim 1, wherein the action includes executing a command for a program operating on the computing device.

4. The computing device of claim 1, wherein the action includes changing a display setting on the computing device.

5. The computing device of claim 1, wherein the action includes changing an audio setting incorporated into the computing device.

6. The computing device of claim 1, wherein the action includes activating a backlight incorporated into the computing device.

7. The computing device of claim 1, wherein the action includes moving a cursor presented in a display of the computing device.

8. The computing device of claim 1, wherein the action includes selecting an object presented in a display of the computing device.

9. The computing device of claim 1, wherein the hand gesture is selected from the group consisting of moving a hand along at least a portion of the length of the keyboard, moving the hand along at least a portion of the width of the keyboard, moving the hand vertical over the keyboard, moving the hand diagonally over the keyboard, moving the hand in a U-shaped movement over the keyboard, moving the hand in a circular movement over the keyboard, and combinations thereof.

10. The computing device of claim 1, wherein the hand gesture is executed with a single hand.

11. The computing device of claim 1, wherein the hand gesture is executed with multiple hands.

12. The computing device of claim 1, further including:
a display;
wherein the programmed instructions, when executed, cause the processor to:
present a controlled parameter in the display; and
change the controlled parameter based on a characteristic of the hand gesture.

13. The computing device of claim 1, wherein executing an action is based, at least in part, on a two-dimensional location of the hand gesture with respect to the keyboard.

14. The computing device of claim 1, wherein executing an action is based, at least in part, on a three-dimensional location of the hand gesture with respect to the keyboard.

15. The computing device of claim 1, wherein executing an action is based, at least in part, on a two-dimensional location of the hand gesture with respect to the keyboard.

16. The computing device of claim 1, wherein executing an action is based, at least in part, on a three-dimensional location of the hand gesture with respect to the keyboard.

17. A method of controlling a computing device, comprising
- identifying changes in capacitance on a sense line of a keyboard even when a key of the keyboard is not depressed, wherein the keyboard includes a transmit line selectively connectable to the sense line through a switch when the key is depressed, the transmit line and the sense line being configured to store capacitive energy between each other when the switch is open and the transmit line is energized;
- identifying a hand gesture performed proximate the keyboard based on the changes in capacitance; and
- executing an action based on at least one the identification of the hand gesture;
- wherein the changes in electrical properties on the sense line due to closure of the switch from a key press are distinguishable from the changes in the capacitance electrical properties on the sense line when an electrical conductor is proximate the key and the switch is open such that the programmed instructions are configured to distinguish between these key press inputs and capacitance inputs and measure both the key press inputs and capacitance inputs from the same sense line.

18. The method of claim 17, further including:
present a controlled parameter in the display; and
changing the controlled parameter based on a characteristic of the hand gesture.

19. A computer-program product for controlling a computing device, the computer-program product comprising a non-transitory computer-readable medium storing instructions executable by a processor to:
- identify changes in capacitance on a sense line of a keyboard even when a key of the keyboard is not depressed, wherein the keyboard includes a transmit line selectively connectable to the sense line through a switch when the key is depressed, the transmit line and the sense line being configured to store capacitive energy between each other when the switch is open and the transmit line is energized;
- identify a hand gesture performed proximate the keyboard based on the changes in capacitance; and
- execute an action based on at least one the identification of the hand gesture; wherein the changes in electrical properties on the sense line due to closure of the switch from a key press are distinguishable from the changes in the capacitance electrical properties on the sense line when an electrical conductor is proximate the key and the switch is open such that the programmed instructions are configured to distinguish between these key press inputs and capacitance inputs and measure both the key press inputs and capacitance inputs from the same sense line.

20. The computer-program product of claim 19, wherein the instructions are executable by a processor to:
present a controlled parameter in the display; and
change the controlled parameter based on a characteristic of the hand gesture.

* * * * *